United States Patent
Curry

(10) Patent No.: US 8,500,371 B2
(45) Date of Patent: Aug. 6, 2013

(54) INTERFITTING TUBULAR MEMBERS

(75) Inventor: Peter James Curry, Ashtead (GB)

(73) Assignee: Britannia Engineering (Isle of Man) Limited, Douglas (IM)

( * ) Notice: Subject to any disclaimer, the term of this patent is extended or adjusted under 35 U.S.C. 154(b) by 439 days.

(21) Appl. No.: 12/675,634

(22) PCT Filed: Aug. 29, 2008

(86) PCT No.: PCT/GB2008/002936
§ 371 (c)(1), (2), (4) Date: Jun. 1, 2010

(87) PCT Pub. No.: WO2009/027694
PCT Pub. Date: Mar. 5, 2009

(65) Prior Publication Data
US 2010/0301602 A1    Dec. 2, 2010

(30) Foreign Application Priority Data
Aug. 31, 2007  (GB) .................................. 0716786.9

(51) Int. Cl.
*F16L 19/00*  (2006.01)

(52) U.S. Cl.
USPC ........... 405/251; 405/199; 405/231; 166/382; 285/92; 285/322

(58) Field of Classification Search
USPC .................. 405/225, 227, 228, 231, 233, 244, 405/250, 251; 403/31, 36, 109.1, 109.5, 403/321, 325, 326, 375, 377; 285/315, 317, 285/319, 322, 123.9, 404, 913; 166/75.14, 166/85.4, 382; 251/1.1
See application file for complete search history.

(56) References Cited

U.S. PATENT DOCUMENTS

| | | | | |
|---|---|---|---|---|
| 4,406,485 A | * | 9/1983 | Giebeler | .................. 285/391 |
| 4,497,592 A | | 2/1985 | Lawson | |
| 4,610,517 A | * | 9/1986 | Fukino et al. | .................. 359/611 |
| 4,635,590 A | * | 1/1987 | Gerace | .................. 123/27 R |
| 4,867,612 A | | 9/1989 | Bassett | |
| 5,071,175 A | * | 12/1991 | Kennedy, Jr. | .................. 285/337 |
| 5,743,677 A | | 4/1998 | Phillips et al. | |
| 6,551,030 B1 | | 4/2003 | Curry | |
| 2002/0117587 A1 | | 8/2002 | Tenma et al. | |

FOREIGN PATENT DOCUMENTS

| | | |
|---|---|---|
| GB | 1385884 A | 3/1975 |
| WO | WO-2006111756 A1 | 10/2006 |

OTHER PUBLICATIONS

Hutter, Manfred, "International Search Report", for PCT/GB2008/002936 as mailed Apr. 9, 2009, 4 pages.

* cited by examiner

*Primary Examiner* — Sean Andrish
*Assistant Examiner* — Carib Oquendo
(74) *Attorney, Agent, or Firm* — Winstead PC

(57) ABSTRACT

An arrangement for fixing two concentric tubes (1, 2) together by means of one or more pressure inducing members, preferably each formed as a pad (6); the member acts to press the tubes together; a support (3), preferably formed as a collar fixed inside the outer tube (1), is provided opposite the or each location of the or each member. The support is designed to maintain the circularity of the inner tube so that it can be readily withdrawn from the outer tube without jamming. This is useful for off-shore installations.

14 Claims, 20 Drawing Sheets

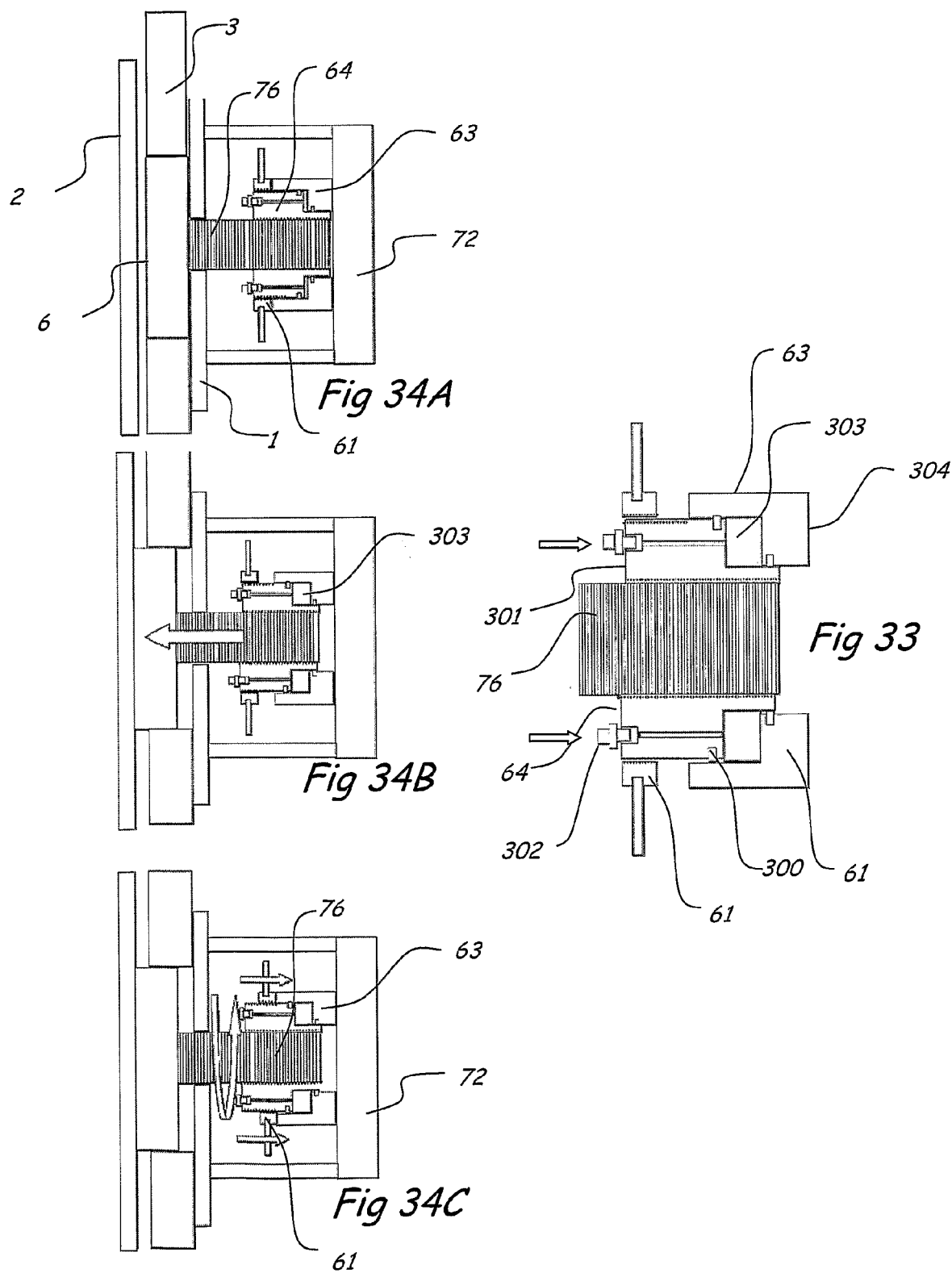

INTERFITTING TUBULAR MEMBERS

The present invention relates to clamping arrangements for fixing two concentric tubular members together.

It is commonly required in the offshore oil and gas industry to connect tubular structural members together subsea. A typical example of a subsea tube to tube connection is a pile to a pile sleeve. One such arrangement is described in U.S. Pat. No. 4,867,612 which proposes multiple pistons to generate friction between the pile and the sleeve. The arrangement has an important drawback in that the load passes from the sleeve to the pile via shear transfer from the pistons with resulting eccentricities thereby inducing high bending moments within the piston. This requires very heavy pins that are susceptible to cyclic fatigue loading and potential failure as a result.

It is an object of the present invention to provide a tubular clamping arrangement. This object can be achieved by the features defined by the independent claim. Further enhancements are characterized by the independent claims.

According to one embodiment there is provided a tubular clamping arrangement for fixing two concentric tubes together comprising a pressure inducing member to force the tubes together at at least one location of the outer tube, wherein a support is provided at the or each location opposite the said pressure member.

Preferably the support is a collar fixed inside the outer tube at the or each location. This is so designed to maintain the circularity of the inner tube so that the inner tube when unclamped may be withdrawn from the outer tube or vice versa with the tubes being caused to jam against each other as could happen with the arrangement shown in U.S. Pat. No. 4,867,612.

Various embodiments of the invention will now be described by way of example in which:—

FIG. 29 shows diagrammatically the action of the nut of FIG. 28;

FIG. 33 shows a cross section of an hydraulic nut for use in at least the embodiment shown in FIG. 13;

FIG. 34 shows the operation of the nut of FIG. 33;

To avoid repetition, all embodiments shown in FIGS. 1 to 22 and 25 to 28 showing outer and inner tubes, are referenced 1 and 2 respectively. Other items such as pads 6 are given the same reference number.

Figure 1:
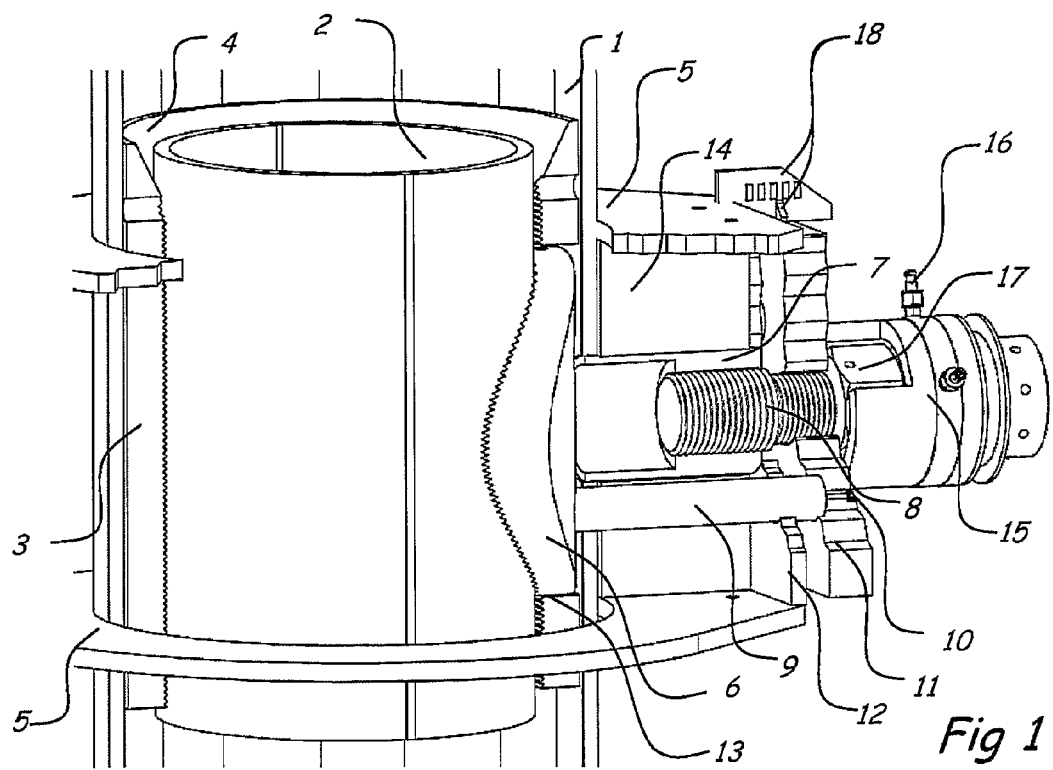
FIG. 1 is a partly cut away elevation showing inner and outer concentric tubes with a clamping arrangement according to a first embodiment of the invention in which a pressure member applies clamping pressure from inside the outer tube onto the inner tube.
Figure 2:
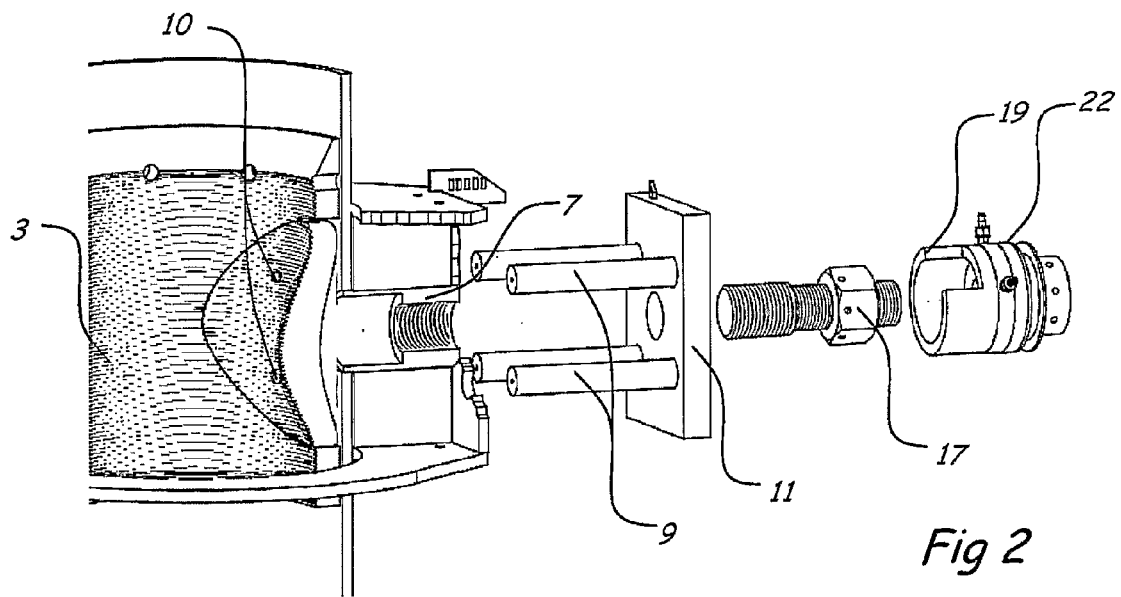
FIG. 2 is an exploded view of the first embodiment.

First Embodiment (see FIGS. 1 and 2)

A feature of this embodiment is the proportions of the movable pad 6. The movable pad 6 when viewed from the side is either round, square or rectangular. It is curved in plan, viewed axially along the length of the collar 3 to match the shape of the inner tube 2. The movable pad is of substantial thickness similar to the thickness of the collar 3 and therefore able to sit within the thickness of the collar 3 thereby allowing uninterrupted passage of the inner tube 2 through the outer tube 1 and collar 3 without contacting the surface of the movable pad 6.

As the movable pad 6 is pushed towards the inner tube 2 it first pushes the inner tube 2 against the far face of the collar 3 thereby developing contact load at the interface. This contact pressure generates frictional resistance to prevent relative axial movement between the outer and inner tubes 1 and 2. As further contact load is applied so the available axial frictional resistance increases. The contact load will eventually cause the inner tube 2 to deform and ovalise. The deformed shape of the inner tube is controlled within limits by ensuring that the initial annular gap between the inner tube 2 and collar 3 is small. As further load is applied to the movable pad 6 the inner tube 2 will be deformed in the perpendicular direction and cause the inner tube 2 to contact the collar 3 at these additional locations thereby further increasing the available frictional resistance. The ability of the combined outer tube 1 and collar 3 to constrain the inner tube 2 shape may be increased by the addition of external ring stiffeners 5.

As the amount of deformation of the inner tube 2 is controllable by restricting the collar 3 internal diameter it is possible to limit the deformation of the inner tube 2 to largely within elastic limits of the material. As a result on release of load in the movable pad 6 the inner tube 2 will for the most part return to its original shape with limited deformation and thereby allow the connection to be released and re-applied if required.

The frictional resistance at the interface between inner tube 2 and both movable pad 6 and collar 3 may be enhanced by the introduction of a high friction material attached to the inside face of the movable pad 6 and collar 3 or alternatively by introducing irregularities or grooves. The irregularities at the interface surface will cause small local deformation (indentation) within the surface of the inner tube 2 and thereby causing a degree of mechanical interlocking.

Axial loading applied to the inner tube 2 will be transferred into the collar 3 in either axial direction by the friction developed between the two. This load path is an important feature of the design. As the collar 3 is a thick ring and the movable pad 6 moves out only a relatively small distance towards the inner tube 2. The movement is such that when the maximum movable pad load is reached the top or bottom edge of the movable pad 6 will still be in contact with the side of the collar recess 13. As a result when axial load is applied downward to the inner tube 2 the load will pass into the movable pad 6 and then transfer directly via the contacting surface on the lower edge of the movable pad 6 into the lower edge of the collar recess 13 by bearing. Likewise when axial load is applied upward to the inner tube 2 the load will pass into the movable pad 6 and then transfer directly via the contacting surface on the upper edge of the movable pad 6 into the upper edge of the collar recess 13 by bearing. Thus there will be little or no bending stress caused in the movable pad 6 or associated pushing mechanism.

The reaction between the movable pad 6 pad and the inner tube 2 will cause both the outer tube 1 and the inner tube 2 to deform in shape and to ovalise. It is important to limit the amount of deformation of both the inner and outer tubes and thereby to prevent crushing of the inner tube 2. The movable pad 6 delivers the load to the inner tube 2 in a manner that constrains the inner tube 2 thereby maintaining it in an essentially circular shape. This is a result of the inherent strength of the device that uses circular sections that employ arching action with tangential direct stresses as opposed to bending stresses. The ability of the inner tube 2 to resist crushing by the movable pad 6 will enhance the capacity of the device.

The stiffness of the inner tube 2 may be increased by a number of different ways. These include:
1) increasing the inner tube wall thickness
2) filling the inner tube with compressive material such as concrete
3) fixing longitudinal stiffeners within the inner tube
4) fixing diaphragm plates at intervals within the inner tube To further enhance the load transfer capacity of the connection the device could incorporate multiple movable pads 6 either one above the other or arranged radially around the circumference of the tubes.

FIG. 1 shows the inner tube 2 inserted inside a collar 3 set within an outer tube 1. In this view the inner tube 2 and collar 3 are shown part removed to expose the view of the movable pad 6. The connection involves the insertion of an inner tube 2 into a larger diameter outer tube 1 then forcing the inner tube 2 against the collar 3 by applying a load through a movable pad 6. The relative axial movement of the inner tube 2 and the outer tube 1 is then prevented due to the friction developed at the interfaces between the inner tube 2 against both the collar 3 and movable pad 6.

The loads generated at these interfaces are high magnitude and cause the inner tube 2 to deform (ovalise). The extent of this deformation is limited by the combined stiffness of the outer tube 2 and the collar 3. To increase the capacity of the outer sleeve to resist this loading a set of external ring stiffeners 5 are envisaged. The ring stiffeners 5 are flared shaped on one side to suit attachment to load transfer stiffening arrangement that delivers the load reaction to the outer tube 2.

Passage of the inner tube 2 through the collar 3 is assisted by a collar taper 4 located at the leading edge of the collar. The collar 3 is fixed to the outer tube 1 typically by welding but may be via close fitting dowels or bolts.

The load applied to the movable pad 6 may be delivered by a number of methods. One method envisaged is introducing an hydraulic jack 15 to drive the movable pad. This may be achieved by attaching the jack with a threaded inner hole to a large diameter central threaded bolt 8, this being centrally arranged on the pad 6. The central threaded bolt 8 is engaged into a threaded ferrule 7 attached to the outer tube 1. The central threaded bolt 8 is also securely anchored to the outer tube 1 using vertical stiffener 14 and ring stiffeners 5.

Hydraulic pressure is introduced to the hydraulic jack 15 via the hydraulic connector 16. This causes the two sections of the hydraulic jack to move apart. The fixed section of the jack 22 is attached to central threaded bolt 8 via the internal thread. The movable section 19 of the jack pushes the thrust plate 11 towards the movable pad 6. The thrust plate 11 is attached to the movable pad 6 via multiple thrust rods 9. Each end of the thrust rod 9 has retaining bolts 10 to fix to the movable pad 6 and the thrust plate 11. The movable section of the jack 15 overarches a load retaining nut 17 mounted on the central rod and moves the thrust plate/thrust rod/movable pad assembly against the inner tube 2. Central threaded bolt 8 may be fixed to the outer tube 1 via direct welding or via a threaded ferrule 7 that is, in turn, welded to the outer tube 1.

The displacement of the movable pad 6 and resulting deformation of the inner tube 2 may be permanently maintained by rotating the load retaining nut 17 so as to bear against the back face of the thrust plate 11. Thus when the hydraulic pressure is removed from the jack 15 the movable pad 6 is unable to return to its original position and thereby permanently retains the contact load between the movable pad 6 and the inner tube 2.

The use of an hydraulic jack with load retaining nut 17 is a known technique to introduce load into a bolt by extending the bolt length which develops strain in the bolt and is not claimed as novel. However, utilising the device to push an assembly as described thereby deforming the inner tube 2 and thereafter retaining that load by rotating the load retaining nut 17 so as to bear against the back face of the thrust plate is considered novel.

The movement of the movable pad 6 may be monitored using the externally mounted graduated scale 18.

Another commonly used tooling system in subsea operations is the hydraulic wrench deployed by either diver or a remotely operating Vehicles (ROV).

Figure 3:
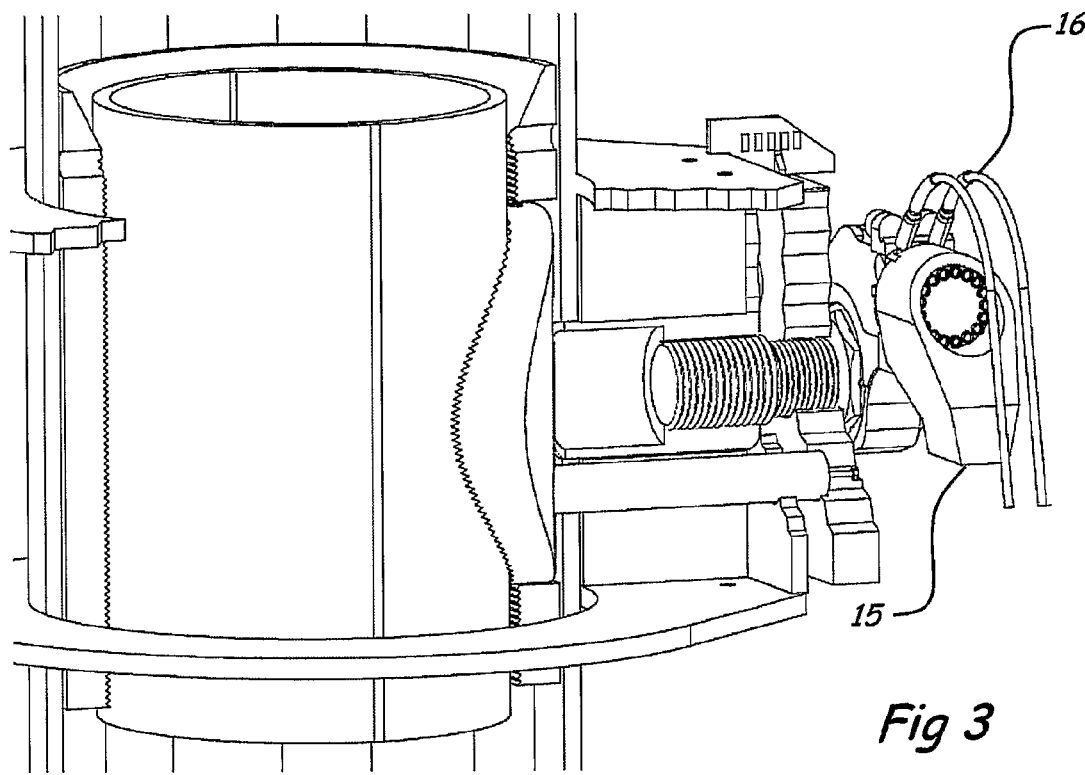
FIG. 3 is a partly cut away elevation similar to FIG. 1 of a second embodiment similar to the first embodiment except that a hydraulic wrench applies pressure on the pressure member.
Figure 4:
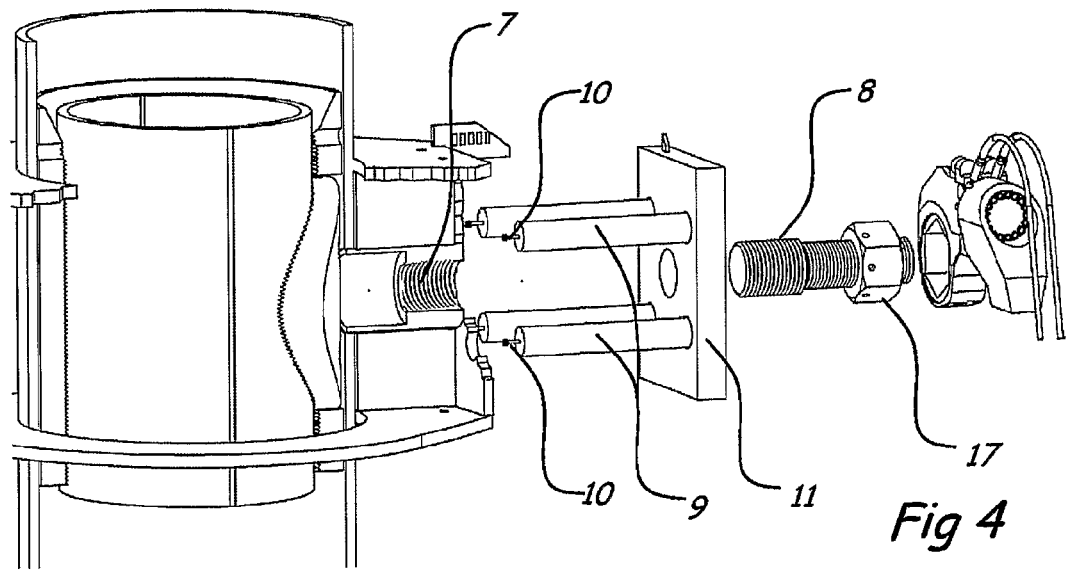
FIG. 4 is an exploded view of the second embodiment.

Second Embodiment (see FIGS. 3 and 4)

The hydraulic wrench 15 is used to apply torque load to a nut 17 or square drive head. The nut 17 is welded to the threaded central rod 8. Thus by applying torsion to the nut 17 the threaded central rod 8 will rotate in the threaded ferrule 7 and move forward the nut 17 against the thrust plate 11. Each end of the thrust rod 9 has retaining bolts 10 to fix to the movable pad 6 and the thrust plate 11. Alternatively the threaded central rod 8 may be threaded into the threaded ferrule 7 and welded at the front edge so as to prevent rotation. Thus when the nut 17 is rotated it moves against the thrust plate 11 and thereby drives the thrust plate/thrust rod/movable pad assembly against the inner tube 2.

Figure 5:
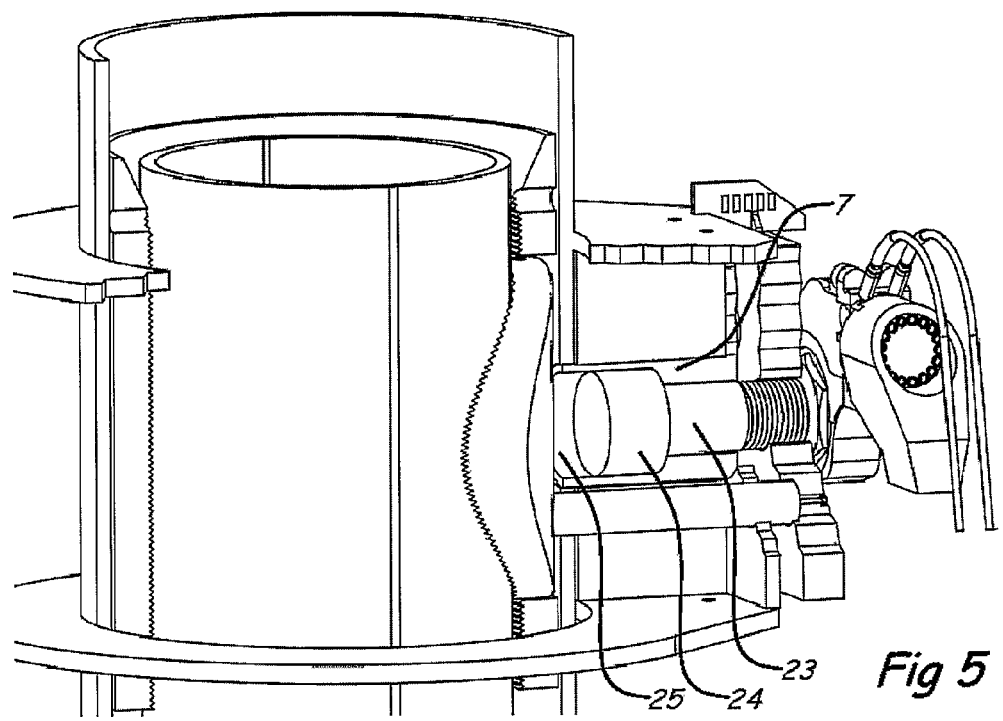
FIG. 5 is a partly cut away elevation similar to FIGS. 1 and 3 of a third embodiment.
Figure 6:
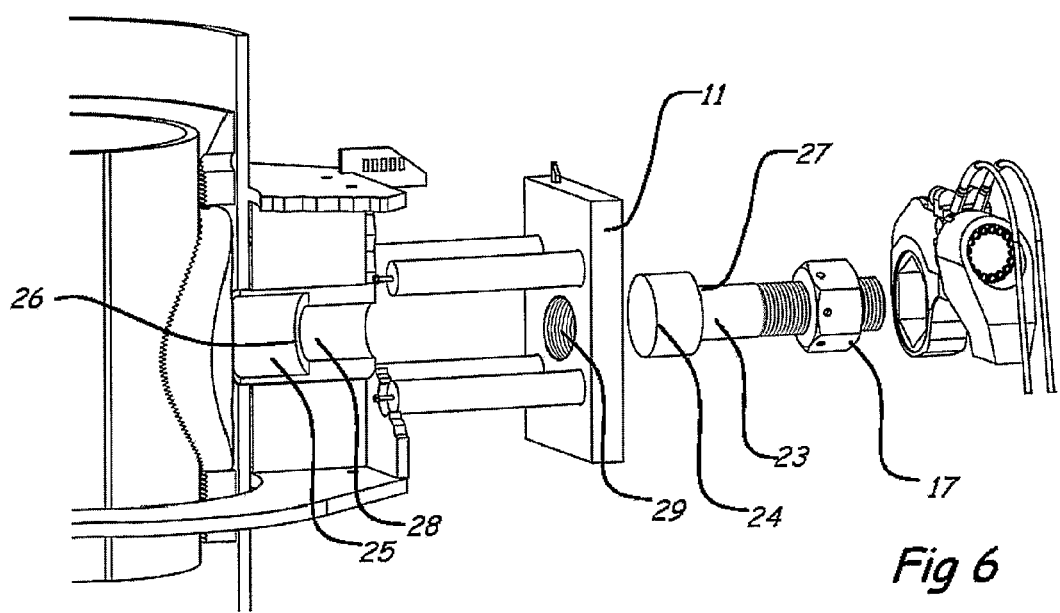
FIG. 6 is an exploded view of the third embodiment.

Third Embodiment (see FIGS. 5 and 6)

A third embodiment is shown in FIG. 5 that also uses the hydraulic wrench 15.

Similar to the device shown in FIG. 3 the ferrule 7 in this case is smooth bored rather than threaded. The ferrule 7 and has a minor barrel 28 and a major barrel 25 into which is located a smooth shafted central rod 23 with a larger diameter central rod head 24 that is a close fit to the inside profile of the ferrule 7. The forward end of the central rod 23 is a threaded section to which a nut 17 is welded. Alternatively the central rod may have a hexagonal of square section at the end of the threaded section rather than a nut 17. The difference in diameter of the ferrule major and minor barrels provides a ferrule bearing face 26 against which the central rod bearing face 27 is able to push. The thrust plate 11 has a threaded hole 29 through which the threaded end of the central rod 23 is screwed until the bearing faces 26 and 27 are in contact.

By applying torque to the nut 17 the central rod rotates and as the bearing faces 26 and 27 are in contact the shaft is unable to move along its axis the rotation of the threaded section within the threaded hole 29 moves the thrust plate along the axis of the central rod 23. Thus the thrust plate/thrust rod/movable pad assembly is moved against the inner tube 2.

An alternative type of known hydraulic jack is the hydraulic nut. Similar to the conventional hydraulic jack this consists of a fixed and movable part but also has a locking collar that is used to lock the movable part once in the extended position.

Figure 7:
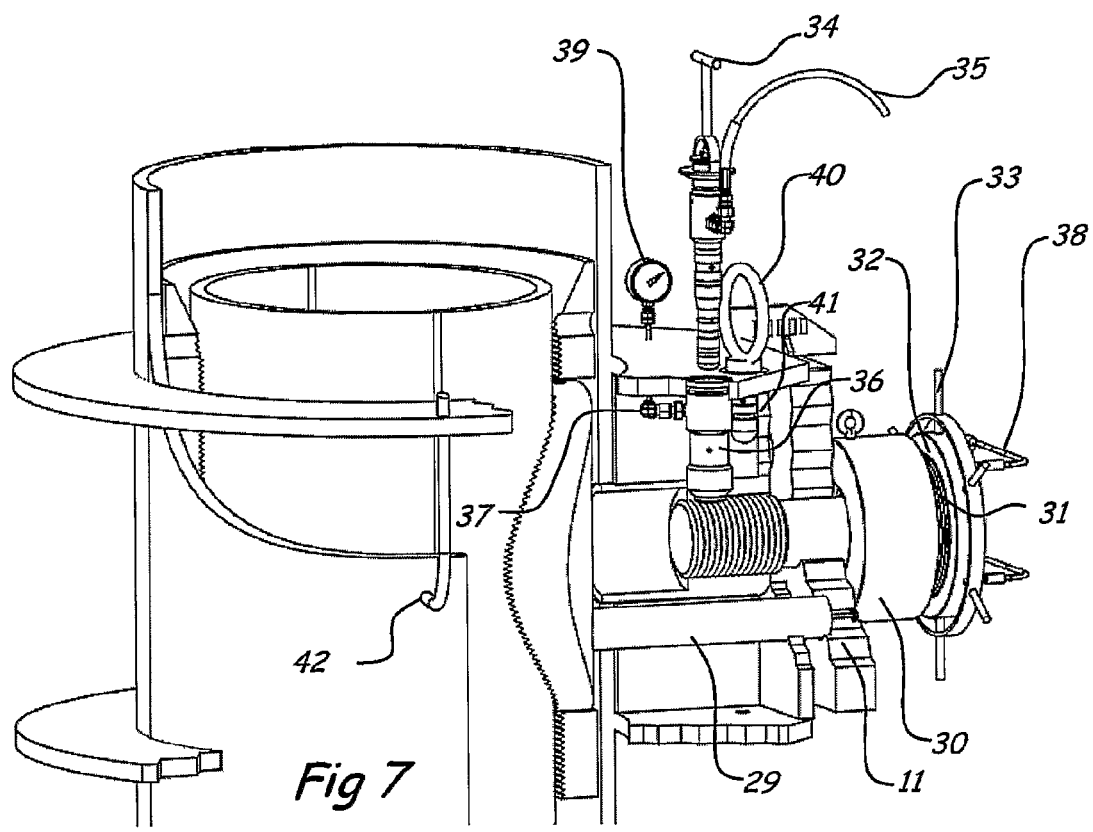
FIG. 7 is a partly cut away elevation similar to FIGS. 1, 3 and 5 of a fourth embodiment.
Figure 8:
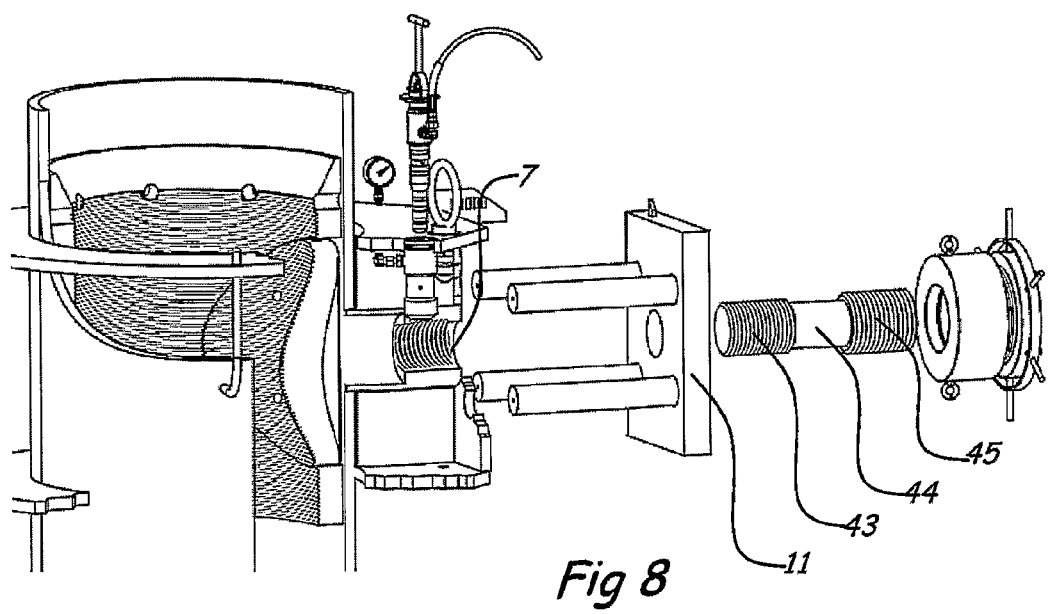
FIG. 8 is an exploded view of the fourth embodiment.

Fourth Embodiment (see FIGS. 7 and 8)

A hydraulic nut rather than a wrench as used in the third embodiment is used. This has an internally threaded fixed section 31 that engages with a threaded central rod 8 via a suitable threaded length 45, a movable section 30 that bears against the thrust plate 11 and a threaded locking collar 32 that engages with the threaded outside face of the fixed section 31

As with the hydraulic wrench 15 the motive force for the hydraulic nut is pressurised fluid. This may be delivered to the hydraulic nut via diver or ROV by hydraulic lines 35. A Hotstab device 34 may be employed that is carried by diver or ROV to a Hotstab receptacle 36 and is mated with the Hotstab receptacle 36. This allows the pressurized hydraulic fluid to be delivered to the hydraulic nut via hydraulic lines 38 and hydraulic connections 37.

To measure the delivered pressure a pressure Gauge 39 is connected to the hydraulic line 38. In order to keep the Hotstab receptacle 36 clean of debris prior to use a dummy Hotstab 40 may be used that normally resides in the Hotstab receptacle 36. During the pressurizing activity the dummy Hotstab 40 is temporarily placed in the dummy Hotstab receptacle 41. An ROV grab handle 42 may be provided to assist the ROV or diver for holding station whilst the above operation is carried out.

When pressurised fluid is introduced into the hydraulic nut the fixed 31 and movable 30 sections of the hydraulic jack move apart. As the fixed section 31 is firmly fixed to the threaded part 45 of the central rod which is in turn attached to the threaded ferrule 7 the movable section of the hydraulic nut moves against the thrust plate 11. Thus the thrust plate/thrust rod/ movable pad assembly is moved against the inner tube 2.

Once sufficient load has been applied the locking collar 32 may be rotated such that the collar moves along the threaded outside face of the fixed section and comes into contact with the movable section 30. Thus when the hydraulic pressure is released the locking collar 32 prevents the return of the movable section 30 back to its original pre-loaded position. Rotation of this locking collar 32 may be carried out by ROV or diver by turning the collar grab handle 33 attached radially on the locking collar 32.

It may be that the operation of the locking collar is difficult to achieve due to lack of access of the ROV or diver. In such circumstances a ratchet device may be employed that effectively locks the jack or hydraulic nut in the extended or loaded position.

Fifth Embodiment (see FIGS. 9, 10, 23 and 24)

The details show the device part removed to reveal the internal form. The detail is as shown is similar to that indicated in FIGS. 7 and 8 but includes a ratchet device. The ratchet device allows movement of the ratchet housing 50 along the central rod 55 towards the thrust plate 11 but prevents the movement in the other direction by engagement of microgroove 52 springheads with mating features on a microgrooved 56 shaft. The term microgroove is used to denote teeth that are unusually small.

The ratchet consists of an open ended barrel shaped ratchet housing 50 one end of which bears against the thrust plate 11. At the other end a ratchet barrel end plate 54 is attached with an opening to allow the central rod 55 to pass. Attached to the end plate 54 is a set of ratchet radial springs 51 arranged around the full circumference.

Figure 23:
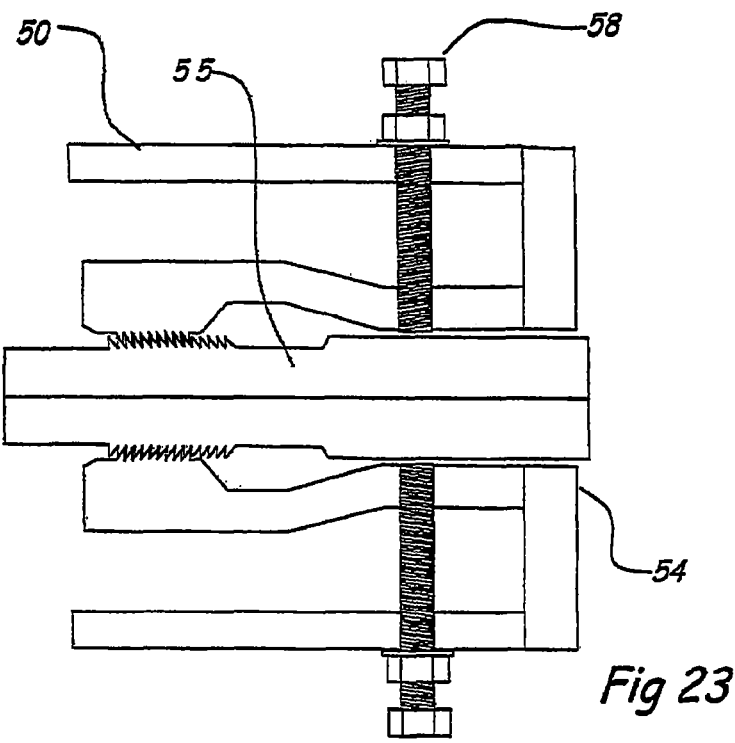
FIGS. 23 and 24 are enlarged cross sections through a ratchet used in the fifth embodiment shown in FIGS. 9 and 10.
Figure 24:
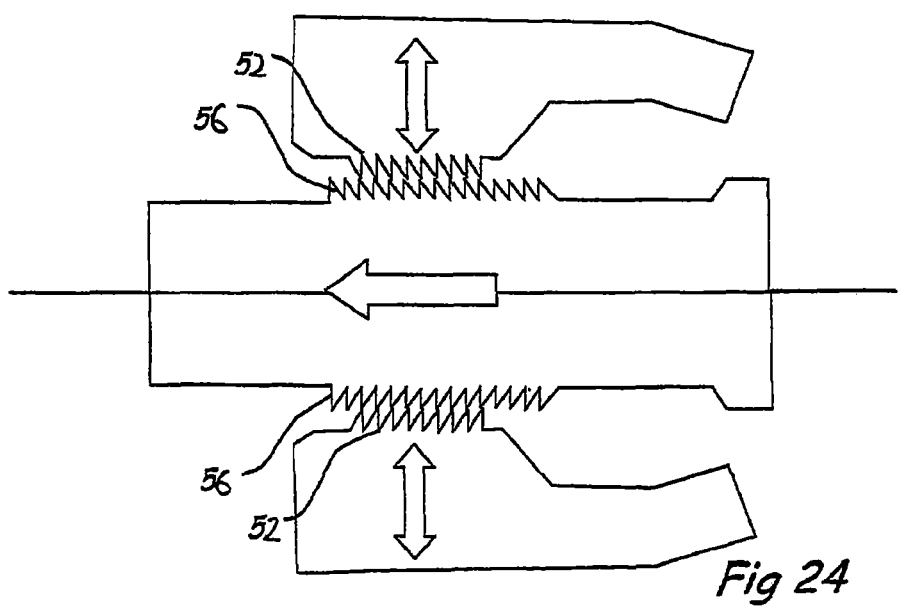

FIGS. 23 and 24 show a large scale cross section through the ratchet. As shown the axis of the central rod is in the horizontal. The microgrooves 56 on the central rod are shaped such that the teeth present an inclined face in the direction towards the thrust plate 11 but a vertical or bluff face in the other. A similar teeth profile 52 is present on the springheads. At rest the inside diameter of the teeth 52 on the springhead are smaller than the outside diameter of the teeth 56 on the central rod. By moving the ratchet housing 50 towards the thrust plate 11 the teeth 52 on the springhead are forced over the teeth 56 on the central rod. The springheads are made from a complete circular profile that have radial cuts allowing the individual springs to move outwards radially. This radial movement allows the inclined face of the springhead teeth 52 to move up the inclined face of the central rod teeth 56. At each incremental movement the springhead teeth 52 return to their radial position whereby the vertical faces of both sets of the teeth become in contact. Thus were the driving load to be removed the contacting vertical faces do not allow retraction of the ratchet housing to its original position. In this way the one-way nature of the device maintains load at or near the maximum applied prior to release of the hydraulic driving pressure.

To allow disengagement of the springhead teeth 52 with the central rod teeth 56 radial spring release bolts 58 are fitted to each radial spring 51. The spring Release bolts 58 are passed through the ratchet housing 50 and into a threaded hole in each radial spring 51. A spring release nut 59 is provided and positioned in contact with the outside face of the ratchet housing 50. By holding the head of the spring release bolt 58 and preventing rotation of the bolt 58 then by rotating the spring release nut 59 the radial spring can be moved radially thereby disengaging the enmeshed teeth 56 and 52 and releasing the load transferred between the central rod and the hydraulic nut moveable section 30.

The size of the teeth or microgrooves are critical in that the delivered load from the hydraulic nut results in primarily elastic deformation of the inner tube 2. Thus the amount of load is essentially proportional to the amount of deformation or movement of the movable pad 6. As each tooth or microgroove represents a proportion of the total deformation then the load that can be delivered and maintained can be seen as a series of steps or increments. When the ratchet has engaged the load will be held at that value, however, as the next incremental load (or deformation step) is being progressed so when hydraulic pressure is released the teeth will return to the previous step before being held. Thus the size of the step or tooth or microgroove is important in that it represents a finite proportion of the whole deformation. By minimizing these steps so the proportion of load that is lost on release of the pressure and subsequent loss of the last increment is also minimized.

Figure 11:
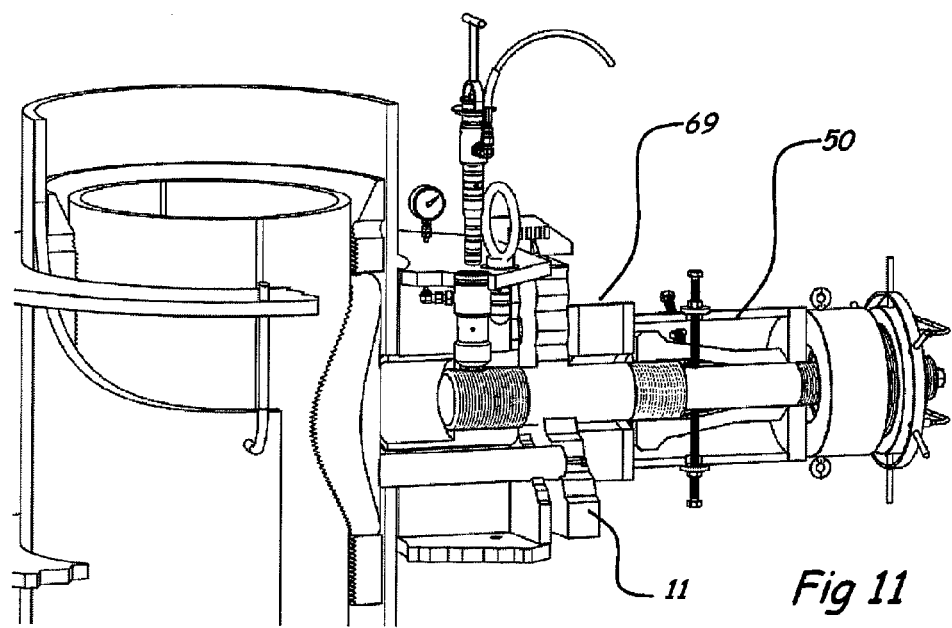
FIG. 11 is a partly cut away elevation similar to FIG. 9 of a sixth embodiment.
Figure 12:
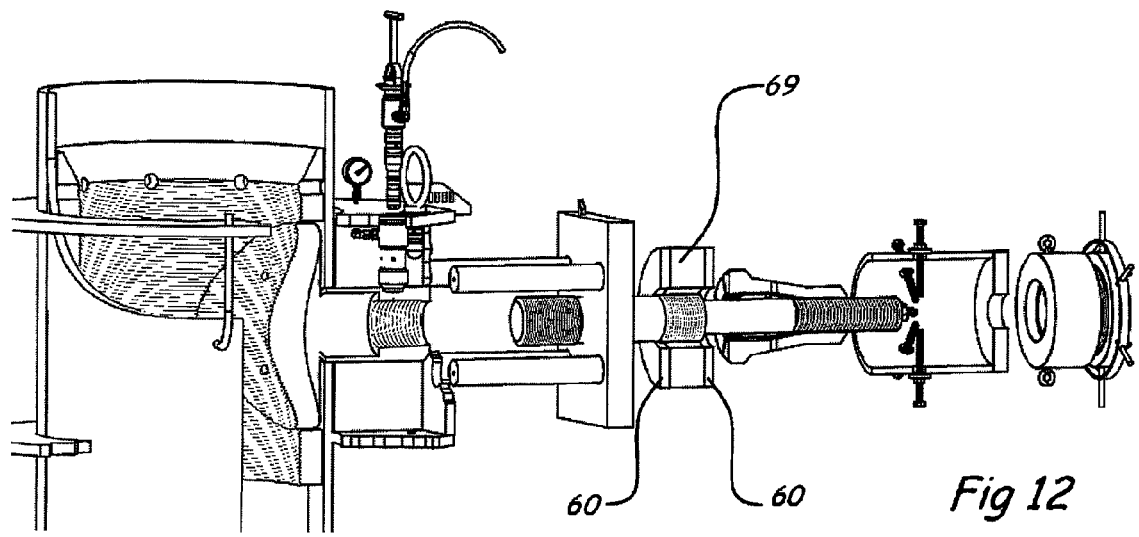
FIG. 12 is an exploded view of the sixth embodiment.

Sixth Embodiment (see FIGS. 11 and 12)

Figure 9:
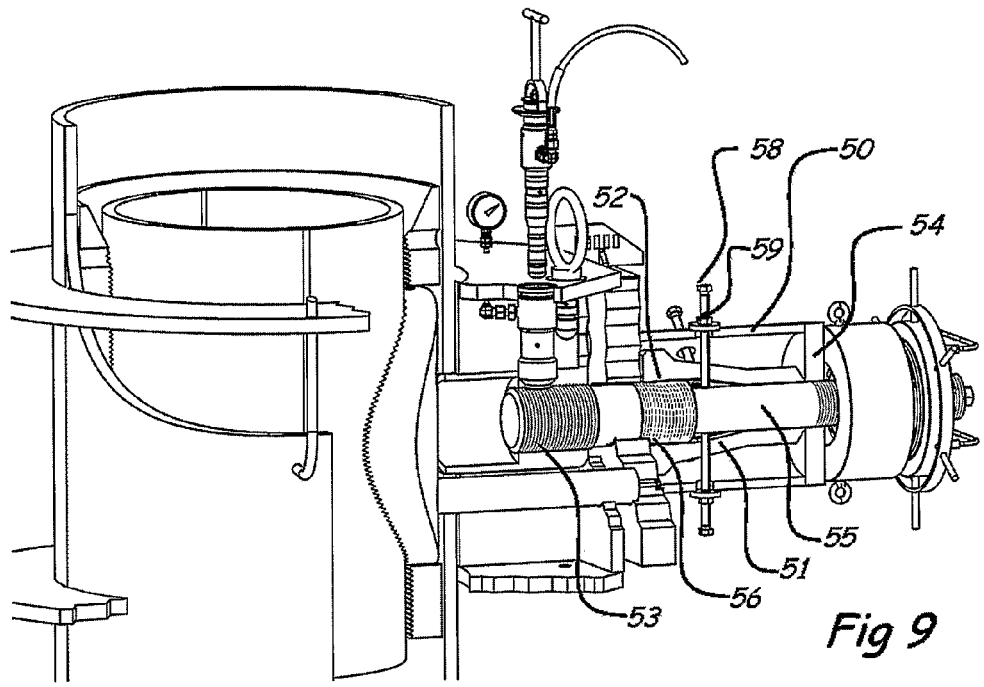
FIG. 9 is a partly cut away elevation similar to FIGS. 1, 3, 5 and 7 of a fifth embodiment.
Figure 10:
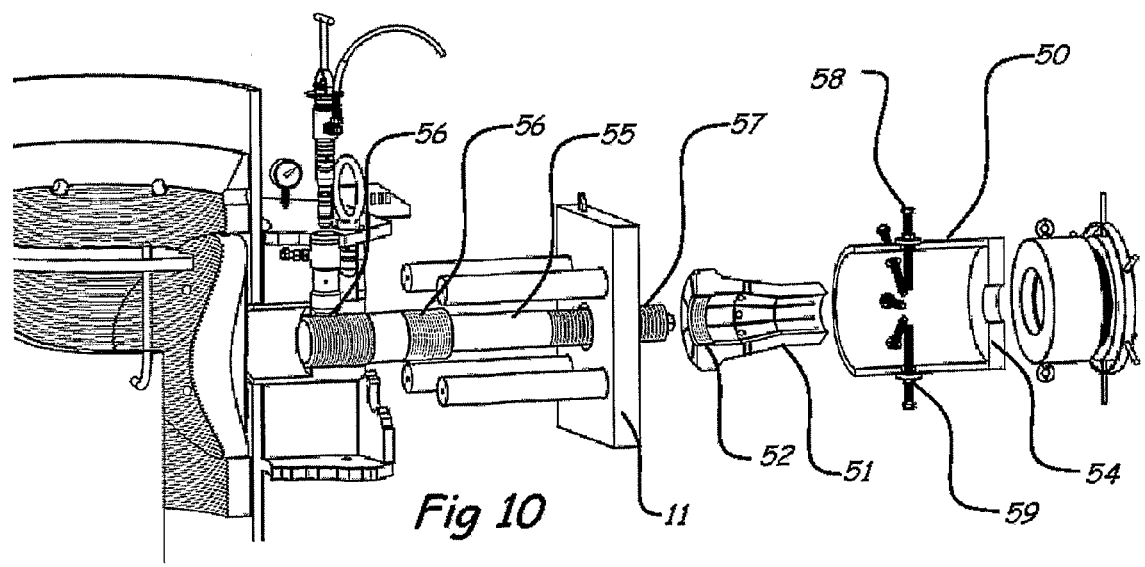
FIG. 10 is an exploded view of the fifth embodiment.

This arrangement is similar to that shown in FIG. 9 but with the introduction of an elastomeric annulus 69 between the ratchet housing 50 and the thrust plate 11.

The flexible nature of the elastomeric annulus 69 increases the amount of movement of the movable section of the hydraulic jack 30. As a result the proportion of load lost due to the release of the last incremental step is further reduced. As the load to be transferred is high the elastomeric annulus 69 may require to be sandwiched between two steel face plates 60.

Figure 13:
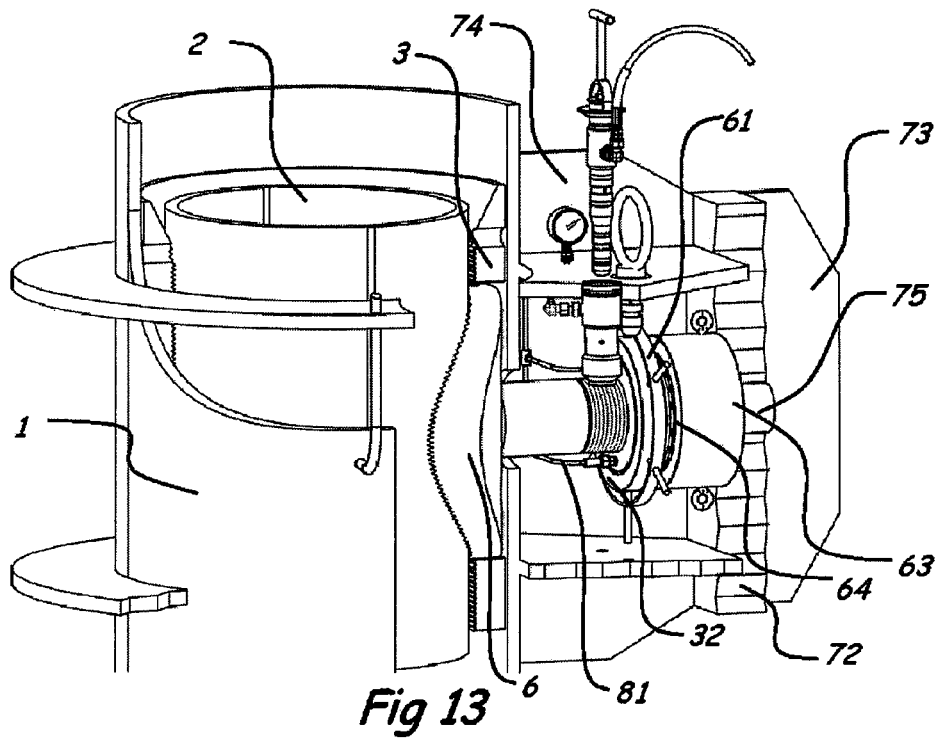
FIG. 13 is a partly cut away elevation with similarities to FIG. 11 of a seventh embodiment.
Figure 14:
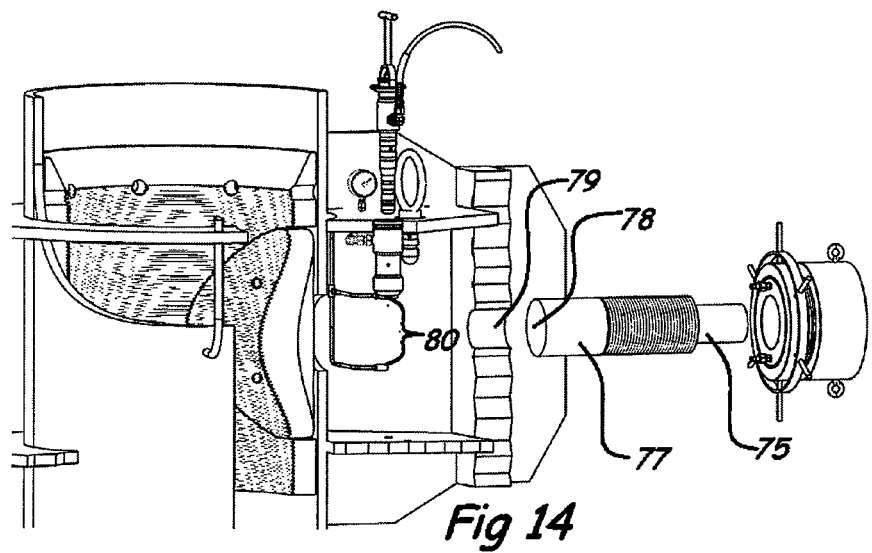
FIG. 14 is an exploded view of the seventh embodiment.

Seventh Embodiment(see FIGS. 13 and 14)

This embodiment is suitable for use with an hydraulic nut. In this embodiment the fixed section of the hydraulic nut 64 is attached to a threaded section of the central rod 77. A smaller diameter section of the central rod extends through the movable section 63 of the hydraulic nut and bears on an opening 79 in the back plate 72. Thus when hydraulic pressure is introduced via hydraulic lines 81 to the hydraulic nut through the hydraulic connectors 80 the movable section 63 moves against the back plate 72. As the back plate 72 is rigidly held by stiffeners 73 and 74 to the outer tube 1 this causes the central rod 77 and attached movable pad 6 to be driven against the inner tube 2.

As in FIG. 7 once sufficient load has been applied the locking collar 32 may be rotated such that the collar moves along the threaded outside face of the fixed section 64 and comes into contact with the movable section 63. Thus when the hydraulic pressure is released the locking collar 32 prevents the return of the fixed section 64 back to its original pre-loaded position. Rotation of this locking collar 32 may be carried out by ROV or diver by turning the locking collar radial grab handles 61 attached to the locking collar 32. The front face 78 of the central rod 77 is convex shaped. This matches the concave shape of the interface surface with the back of the movable pad 6 thus allowing some rotation of the pad should alignment of inner tube 2 and outer tube 1 occur.

Figure 28:
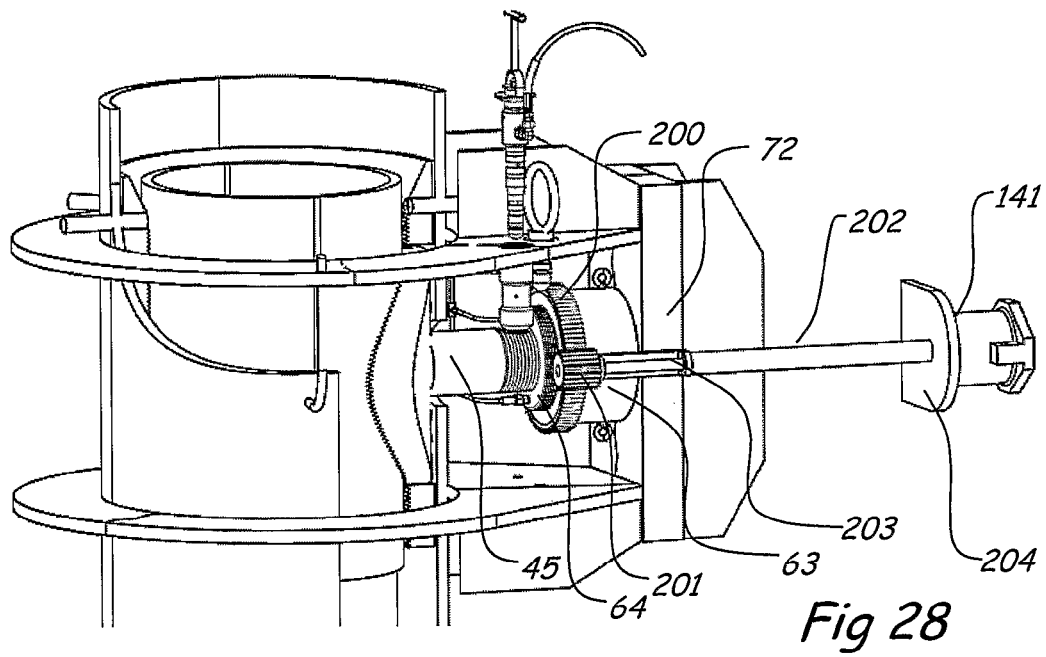
FIGS. 28 and 29 show an eighth embodiment.
Figure 29:
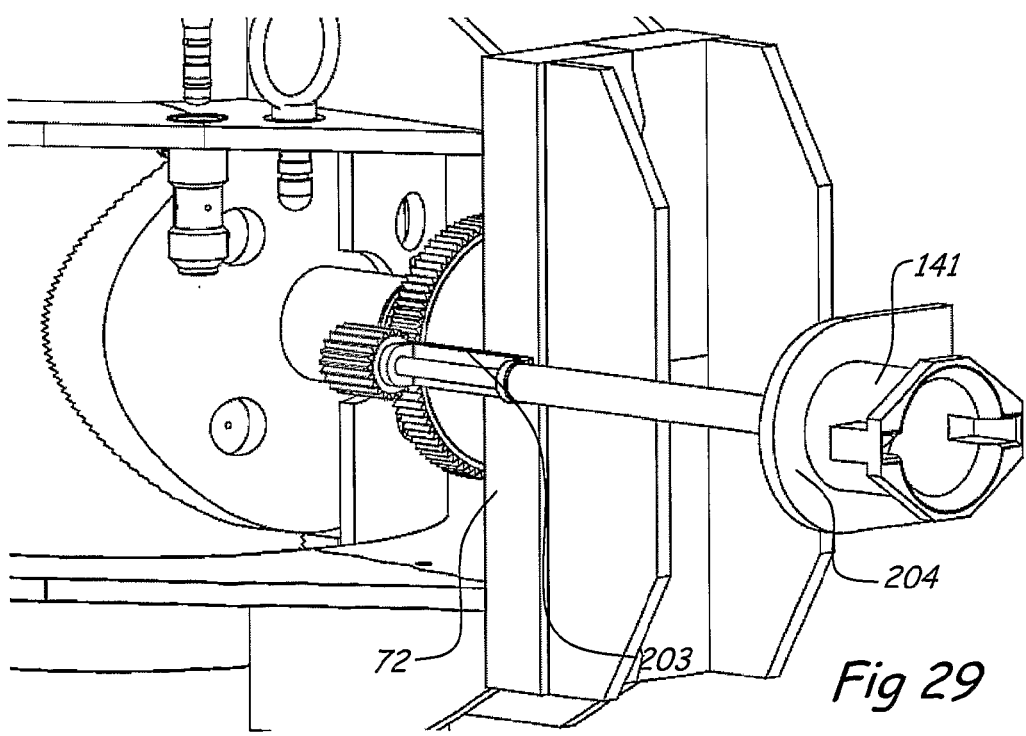

Eighth Embodiment (see FIGS. 28 and 29)

An alternative arrangement of operating the locking collar shown in FIG. 13 is provided. Here the conventional locking collar is replaced by a toothed gear locking collar 200 with a threaded inside face. A drive shaft 202 with a toothed drive gear wheel 201 is offset from the central rod such that the teeth engage. The drive shaft runs parallel with the central rod 45 one end attached to the back plate 72 via a bracket 203 and the other in a remote support plate 204 attached to the main structure. An ROV receptacle 141 may be attached to front face of the remote support plate 204 such that the end of the drive shaft projects into the ROV receptacle. This projecting part of the drive shaft to be square in cross section suitable for engagement with a rotary tool.

The torque delivered by the rotary tool causes the shaft to turn thereby rotating the drive gear wheel 201 which in turn causes the toothed gear locking collar 200 to turn and moves the toothed gear locking collar 200 along the threaded outside face of the fixed section of the hydraulic nut 64 thereby coming into contact with the movable section 63. Thus when the hydraulic pressure is released the toothed gear locking collar 200 prevents the return of the movable section 63 back to its original pre-loaded position.

Figure 15:
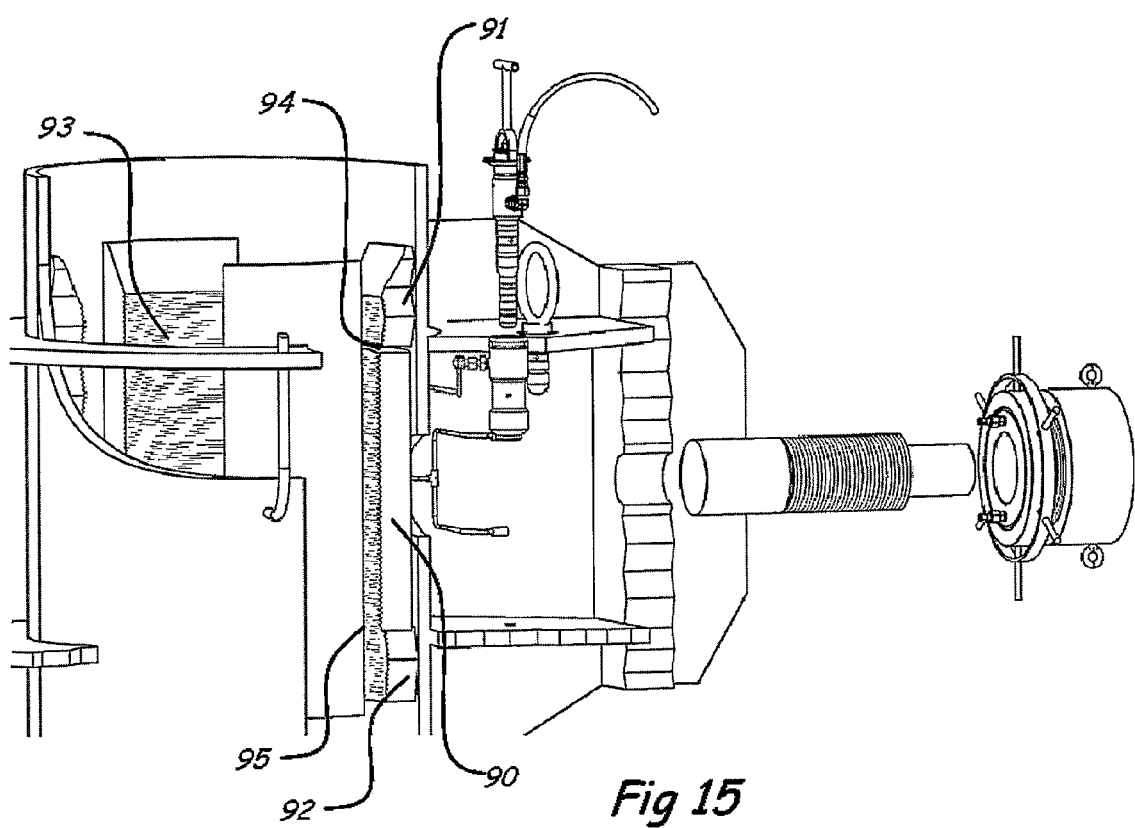
FIG. 15 is a partly cut away and exploded view of a ninth embodiment similar to FIG. 14.

A Ninth Embodiment (see FIG. 15)

This also is suitable for use with an hydraulic nut. This arrangement is similar to that shown in FIG. 14 except for the collar 3 is replaced by a set of heavy fixed shims 92 and 93. The movable pad 90 is not circular in elevation but rectangular. In this case frictional load between the movable pad 90 and the inner tube 2 is transferred to the fixed shims 91 and 92 via direct bearing on either the movable pad upper bearing face 94 or movable pad lower bearing face 95 depending on load direction.

Figure 16:
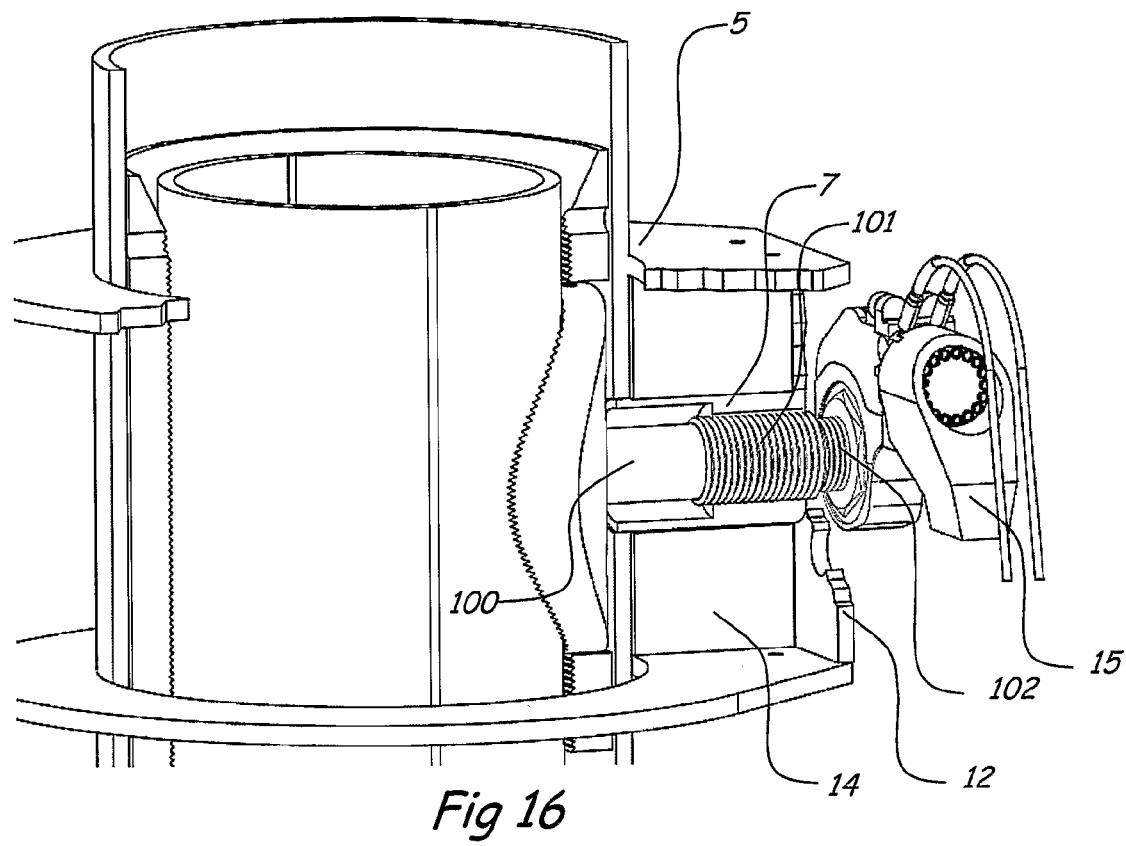
FIG. 16 is a partly cut away view of a tenth embodiment.
Figure 17:
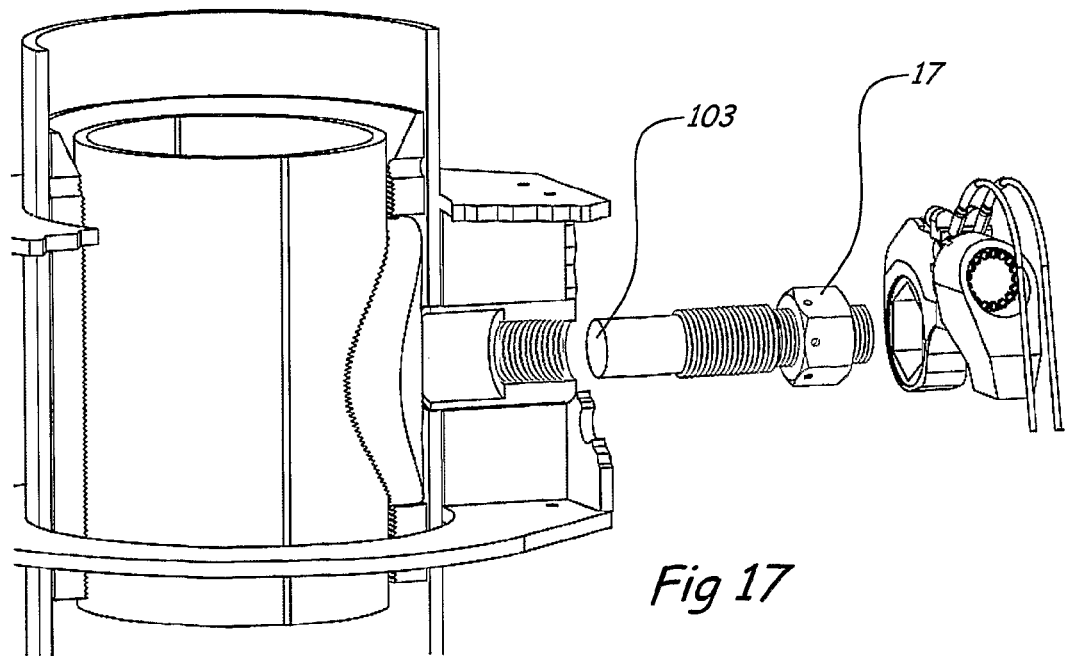
FIG. 17 is an exploded view of the tenth embodiment.

Tenth Embodiment (see FIGS. 16 and 17)

This is also suitable for hydraulic wrench 15. This embodiment avoids the use of both the thrust plate 11 and thrust rods 9. It employs an extended central rod 100 so as to directly contact the back of the movable pad 6. With nut 17 welded to the threaded central rod 102 then by applying torsion to the nut 17 the threaded central rod 101 will rotate in the threaded ferrule 7 and move forward to directly push the movable pad 6 against the inner tube 2. The end of the extended central rod 103 is shaped convex. This mates with a concave surface at the back of the movable pad 6 to allow for a small degree of rotation.

Figure 18:
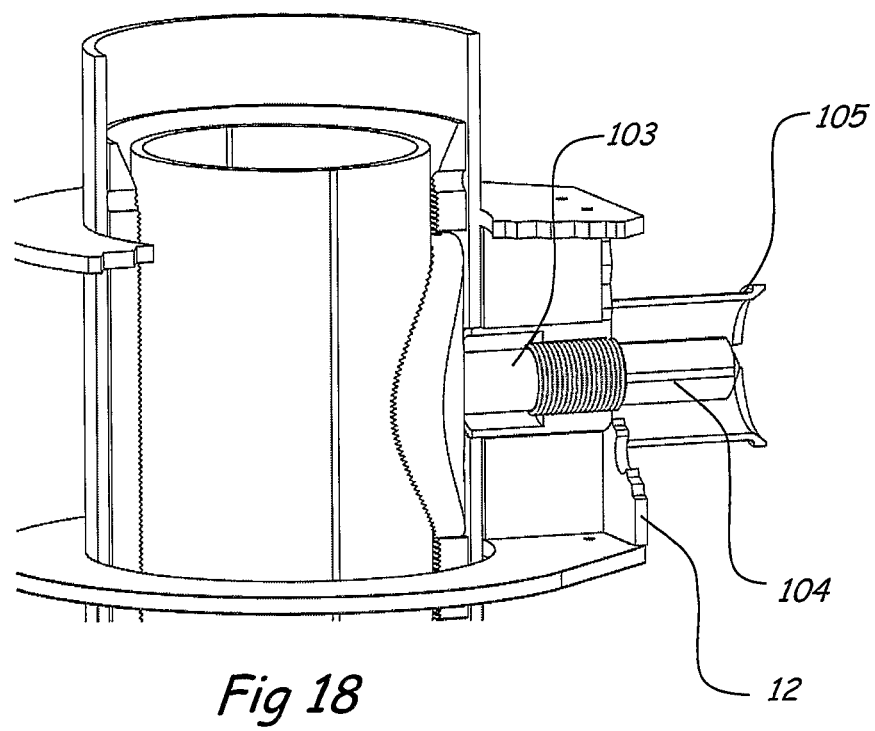
FIG. 18 is a partly cut away view of an eleventh embodiment similar to the tenth embodiment.
Figure 19:
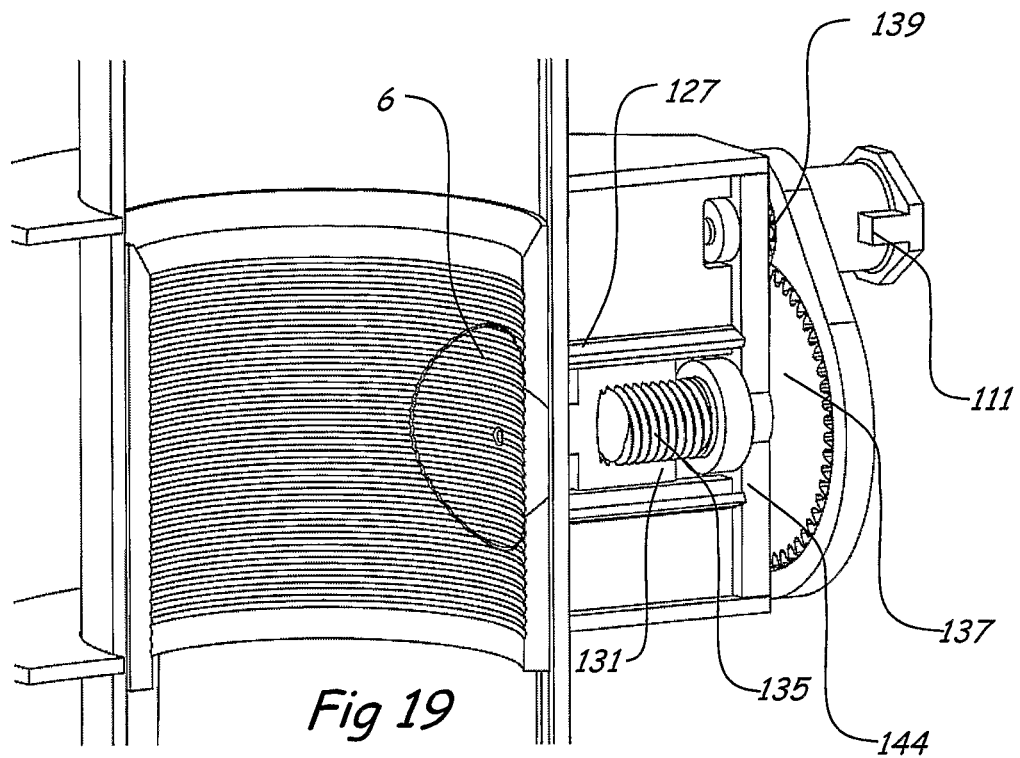
FIG. 19 is a partly cut away view of a twelfth embodiment with its pressure inducing member retracted.
Figure 20:
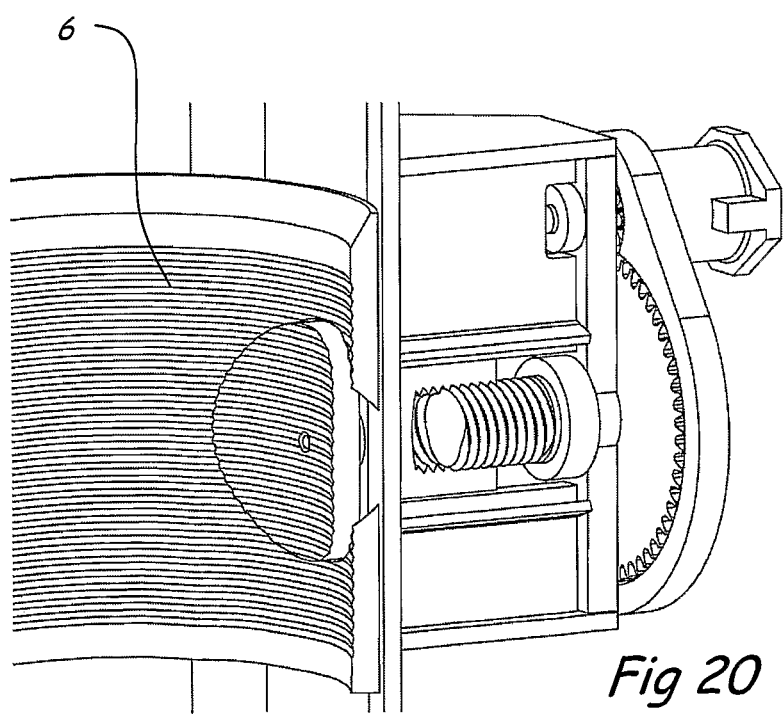
FIG. 20 is a view of the embodiment of FIG. 19 with the member extended.
Figure 21:
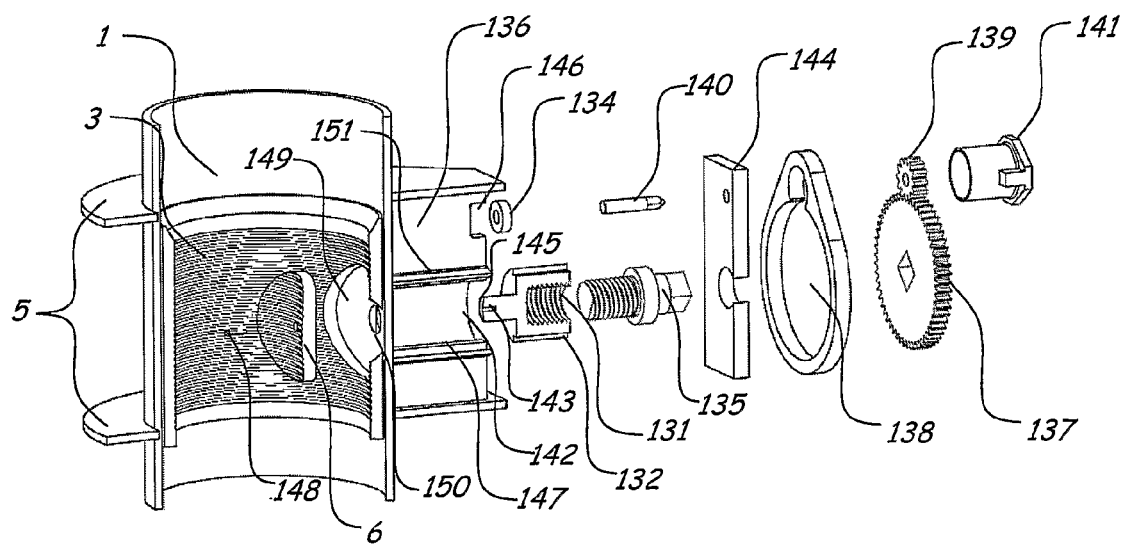
FIGS. 21 and 22 are exploded views of the twelfth embodiment.
Figure 22:
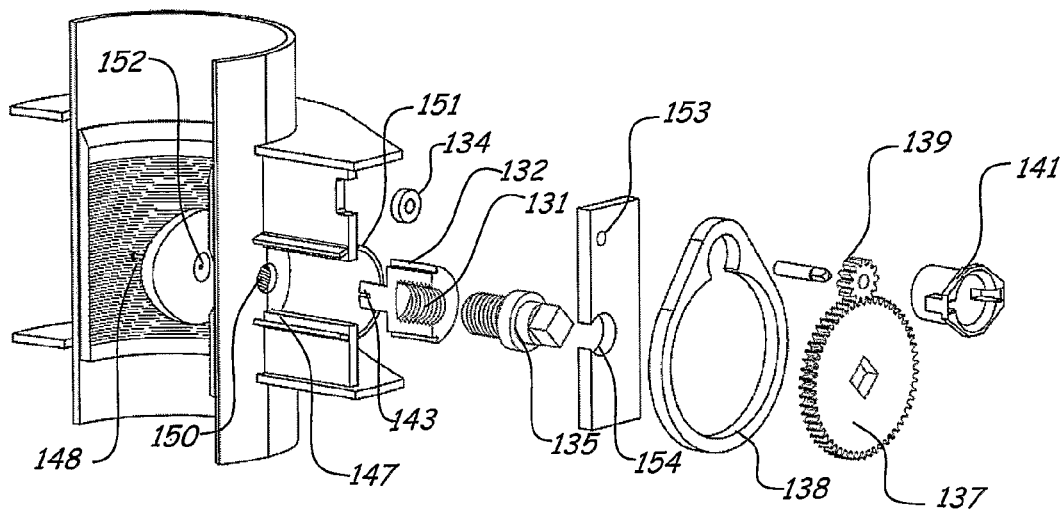

Eleventh Embodiment (see FIG. 18)

This is suitable for a rotary tool (not shown). The embodiment is similar to that shown in FIG. 17 but in this case the extended central rod 103 has a Square shaft 104 that engages with the rotary tool. The rotary toll mates with the ROV receptacle 105 and the delivered torque reacts through the ROV receptacle 105 into the back plate 12 thereby rotating the extended central rod 103 and driving the movable pad 6 forward into contact with the inner tube 2. The view shown in FIG. 18 shows a number of elements cut away e.g. the ROV receptacle 105 to better indicate the device.

Twelfth Embodiment (see FIGS. 19 and 20, 21 and 22)

A commonly used tooling system in subsea operations is the rotary hydraulic tool (not shown) deployed by a diver or a remotely operating Vehicles (ROV). The rotary hydraulic tool is a standard piece of equipment that is used to apply a continuous torque load to a standard square drive or axle 140. A number of torque tools of varying load capacity are available commercially. These tools interface with a standard ROV interface receptacle 141. The size of the tool and receptacle vary depending on the rating of the tool. The larger tools, capable of delivering high torque loads, are less commonly available. This application does not seek to incorporate any claims to either the ROV tool or ROV receptacle.

The device, as proposed, incorporates a geared system that magnifies the delivered torque which enables a relatively small capacity torque tool to deliver a larger effective torque by using a gearing system that multiplies the delivered torque by the approximate ratio of the diameters of the secondary gear wheel 137 to that of the primary gear wheel 139. The use of a gearing system to magnify torque is not claimed as novel although utilising the gearing system together with the method of transferring rotary motion into forward travel via the use of a threaded guided ferrule 131 is considered novel.

Once the inner tube is located within the outer tube 1 and collar 3 the rotary tool is to be engaged into the ROV receptacle 141. External dogs on the rotary tool will engage with the features incorporated in the side of the receptacle thereby providing a means of reacting the delivered torsion from the tool. The receptacle is firmly fixed to the end plate 144 and thereby torque reactions are transferred via stiffener plates 136 and ring stiffeners 5 into the outer tube 1.

By attaching the primary axle 140 to a primary gear wheel 139 and passing the axle through a hole 153 in the end plate 144 the gear is held in direction. By attaching a primary axle retaining ring 134 to the primary axle on the inside of the end plate the primary axle is able to rotate but otherwise be held in position. A notch 146 is provided in the stiffener 136 to accommodate the primary axle retaining ring. A secondary gear wheel 137 is positioned such that the teeth of the secondary gear wheel enmesh with the teeth of the primary gear wheel. The secondary gear wheel is attached to a secondary axle 135 that passes through the end plate 144 and into a sliding threaded ferrule 131. The secondary axle is square in section at one end and threaded at the other end. The square end engages with the secondary gear wheel 137 whereas the threaded end engages with the sliding threaded ferrule 131. The secondary axle 135 is held in position by the end plate secondary axle hole 154. By rotating the secondary gear 137 the secondary axle 135 rotates moving the threaded sliding ferrule 131 along its axis towards the movable pad 6. The end of the threaded sliding ferrule 131 has a convex surface 145 that passes through an opening 150 in the outer tube 2 and engages with a corresponding concave surface 152 on the back face of the movable pad. To hold the movable pad onto the end of the threaded sliding ferrule a movable pad locating bolt (148) is used. Furthermore to prevent the movable pad 6 rotating about the axis of the secondary axle 135 the threaded sliding ferrule 131 has a groove or slot 132 that engages with a ferrule guide rail 147 top and bottom thereby ensuring the sliding ferrule moves only longitudinally.

The rails are stiffened by a split cover tube 151 that encloses the threaded sliding cylinder 131 and is fixed to both the back plate 144 and the stiffeners 136 to the outer tube 1. The space inside the split cover tube 151 may be filled with lubricant and or preservative to ensure good resistance to corrosion.

To protect the gears from damage a cowling 138 may be incorporated. The cowling may be covered front and back and the space inside may be filled with lubricant and or preservative to ensure good resistance to corrosion and impact damage from the activities.

Figure 25:
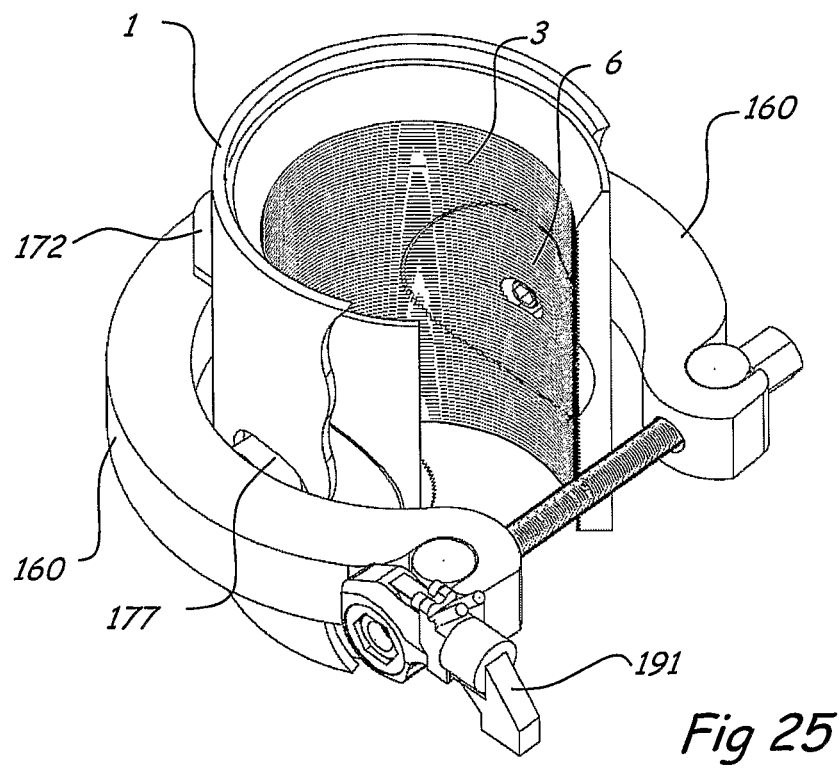
FIGS. 25 and 26 are partly cut away perspective views of a thirteenth embodiment.
Figure 26:
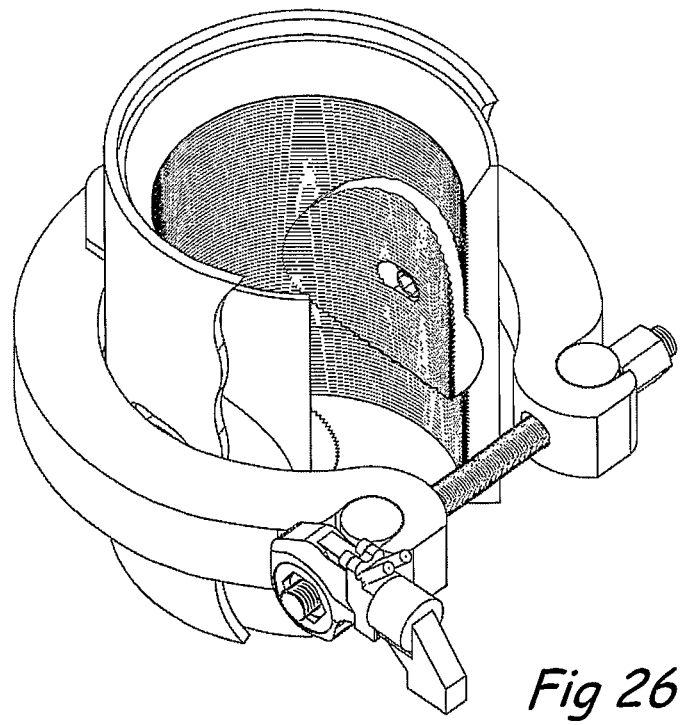
Figure 27:
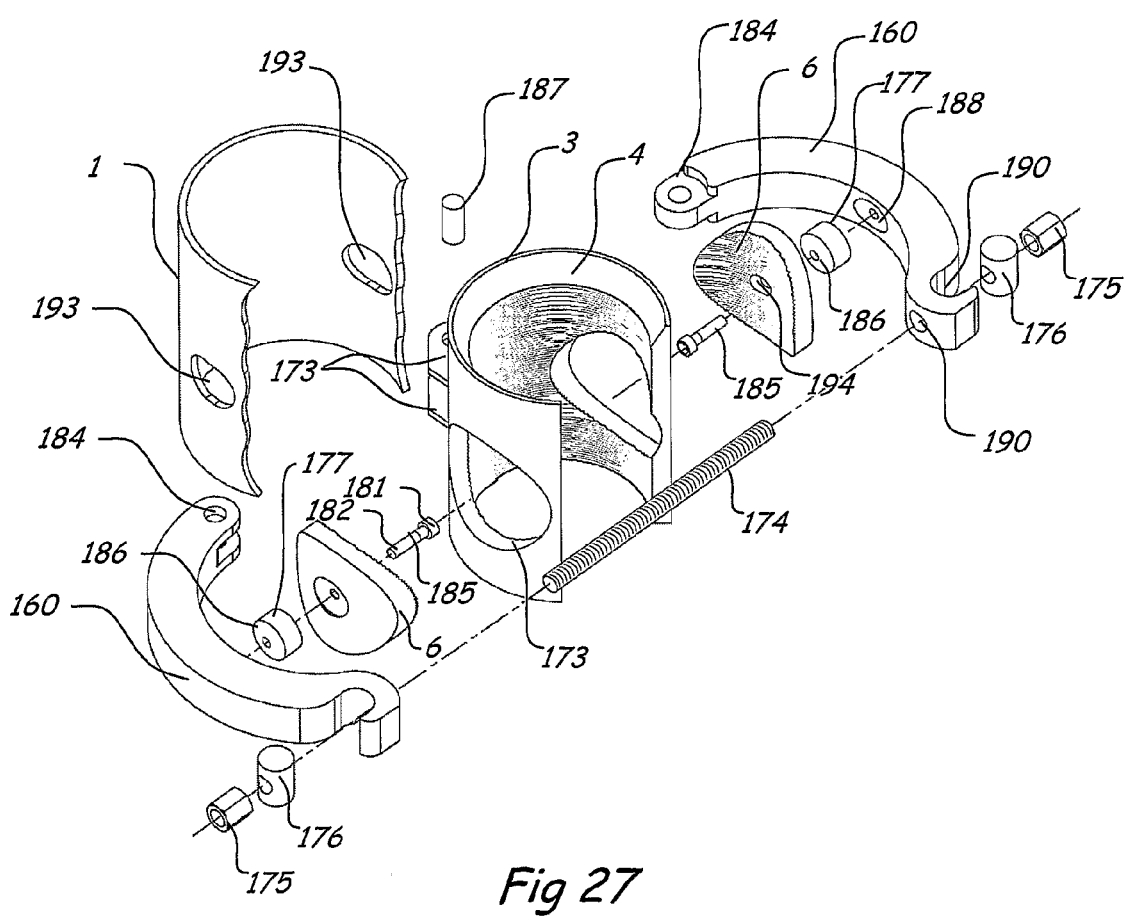
FIG. 27 is an exploded view of the thirteenth embodiment.

Thirteenth Embodiment (see FIGS. 25, 26 and 27)

This arrangement uses an external hinged clamp to deliver the load on the movable internal pads. FIG. 25 shows the clamp prior to partial closing. FIG. 26 shows the clamp partially closed with the movable curved pads 6 encroaching into the gap within the collar 3 thereby gripping the inner tube 2 not shown. FIG. 27 shows an exploded view of the device.

This device uses a pair of clamp arms 160 rotating about a hinge 172 thereby applying a load to an inner tube 2 via opposing plug elements 177 projecting from the inside face of the clamp arms 160. The plugs 177 are attached to an opposing pair of movable curved pads 6 located within an opening 173 in a heavy collar 3 situated between the inner tube 2 and outer tube 1. The movable curved pads 6 are of similar thickness to collar 3 such that the movable curved pads are initially not projecting forward of the collar 3. The plugs 177 pass through the outer tube 1 via openings 193 in the outer tube. The tubes are locked together by moving the clamp arms 160 together.

Transfer of the axial load from one tube to another is by a combination of both friction and elastic or permanent (controlled) deformation of the inner tube 2. The primary load transfer occurs between the inner tube 2 and the contacting movable curved pads 6 and then via direct bearing of the movable curved pads 6 against the collar opening 173. This load transfer capacity is available in both axial load directions.

The deformation of the inner tube 2 is constrained by the outer tube 1 and the collar 3 from adopting a free deformation shape i.e. ovalising. This method of controlling the free deformation increases the resistance of the tube to the clamping action and thereby increases the available friction that may be developed. There may be some permanent deformation of the inner tube 2. Such deformation will increase the ability to transfer axial load as there will be a mechanical interference between the movable curved pads 6 and the inner tube 2.

The plug 177 is attached to the movable curved pads 6 using a bolt 185 passing through the movable curved pads 6 then through the plug 177 and into the clamp arm 160 using the bolt threaded end 182. The bolt head 181 is set back into a recess 194 in the movable curved pad so as not to interfere with the passage of the inner tube 2. The ends of the plug 177 are convex 186 and the contacting surfaces of the clamp arm 160 and the movable curved pads 6 are concave to allow for some rotation to accommodate misalignment of the inner tube 2 with respect to the outer tube 1. The collar 3 has a taper 4 to assist guidance of the inner tube 2 through the collar 3.

Both the movable curved pads 6 and collar 3 may have irregularities or grooves introduced on the interface surface to assist in increasing effective friction once clamped.

The inner tube 2 may be filled with concrete or similar or have internal stiffeners to allow additional clamping load to be applied thereby increasing the available frictional resistance of the connection. The internal stiffeners may be either fixed permanently inside the inner tube or be marginally undersized so as to allow them to be fitted into the inner tube prior to clamping.

To increase load transfer capacity there may be more than one such clamping arrangement in series one above the other or alternatively there may be clamping arrangement placed both at right angles to each other and in series to encourage opposing deformations and thereby increase the interlocking effect of the deformations.

To further increase load transfer capacity there may be multiple plug elements 177 and movable curved pads 6 per clamp arm.

The hinge 172 consists of a pair of interleaved plates 184 with a pin 187 passing through. The hinge 172 includes support plates top and bottom of the clamp arms 160 to help locate the clamp arrangement on the outer tube 2. The clamp may have one or more hinges to assist in following the circular form.

The loading of the inner tube 2 will be via closure or part closure of the clamp arms 160. Operation of the clamp, i.e. closure or part closure of the clamp, may be caused by use turning a nut 175 on a threaded rod 174 or by rotating a cam piece (not shown) at the end of a plain rod. Each end of the threaded rod 174 passes through ferrule 176 with a hole to allow passage of the threaded rod 174. This is to accommodate the change in angle of the threaded rod 174 with respect to the clamp arms 160. The opening 190 for the threaded rod 174 in the clamp arm 160 is also shaped to accommodate this change in angle.

The operation (part closure) of the clamp may be achieved via a range of methods. Methods include a direct hydraulic jack, an hydraulically operated 191 or manually operated wrench, or a hydraulically operated rotary tool. In the case of use in a subsea environment the tool could be delivered to the clamp by either an ROV (remotely operated vehicle) an ROT (remotely operated tool) or a diver.

The operation of the rotary action may be at some distance from the clamp head by addition of an extension piece to the threaded rod 174. The rod may have opposing threads at each end to increase the speed of closure. The ferrule 176 may have a threaded hole or a plain hole. If a plain hole is used the rod will have a fixed nut at the remote end.

The clamp arm end shape in the vicinity of the ferrule 176 shows an open ended fork 190. It may be that the clamp end will be a closed end shape with the ferrule 176 passing through a circular hole.

The collar 3 may be substituted by an arrangement of radially spaced plates with gaps between them. The movable curved plate 6 may be a rectangle curved in plan rather than a circle curved in plan as shown. Should the movable curved plate 6 be rectangular then fixed plates will be placed immediately above and below the movable plate to allow direct transfer of the load in the movable curved plate 160.

The amount of clamp movement and deformation of the inner tube 2 may be ascertained by the use of projecting indicators (not shown) on either or both of the inner face of the clamp arms 160. The hydraulic pressure delivered to the tool will be monitored throughout the operation. This will correlate to the amount of load delivered to the movable pads 6. The closing gap would give an indication of the change in diameter of the inner tube 2 and may be used in conjunction with the above load indication to assess the force displacement relationship of the connector arrangement. This data will be of use in establishing the interface loading and therefore the load transfer capacity of the system.

In order to save weight and cost the clamp arms 160 may be in the form of an open I section, C section or closed box section rather than the solid section as shown.

With all of the embodiments it would be advantageous to ascertain the amount of load delivered by the clamping action at the interface between the tubes (1 and 2). This load may be determined by indirect or direct methods. An indirect method would be the measurement of hydraulic fluid pressure within the jack or the hydraulic pressure generated in the rotary tool in order to overcome the bolt thread friction. Similarly a calibrated torque wrench may be used. Alternatively the load may be determined by direct measurement of a compression load cell introduced between the back plate 72 and the movable section 63 (or between the thrust plate 11 and the back plate 12). A further alternative would be to introduce a strain based load indicating device directly into the main central bolt 8 or central rod (23 or 77).

In FIGS. 33 and 34, a hydraulic nut 304 used in at least FIG. 13 is shown by way of explanation and is made by Hydratight of Walsall, England. The nut comprises a body 63 which is effectively a cylinder, an internally threaded body 64 which is screwed onto shaft or central rod 76 and which is externally threaded to receive collar 61. A seal 300 acts to seal fluid pumped into ports 301 and 302 and into chamber 303. FIG. 33 shows the operation of the nut. FIG. 33A shows the pressure pad 6 resting against the inner tube 2. Ports 301 and 302 are then pressurised as in FIG. 33B so that rod 76 acts on pad 6 and displaces body 64 relative body 63. As shown in FIG. 33C collar 61 is then rotated to lock bodies 63 and 64 in the position where pad 6 locks tube 1 on to tube 2.

Figure 30:
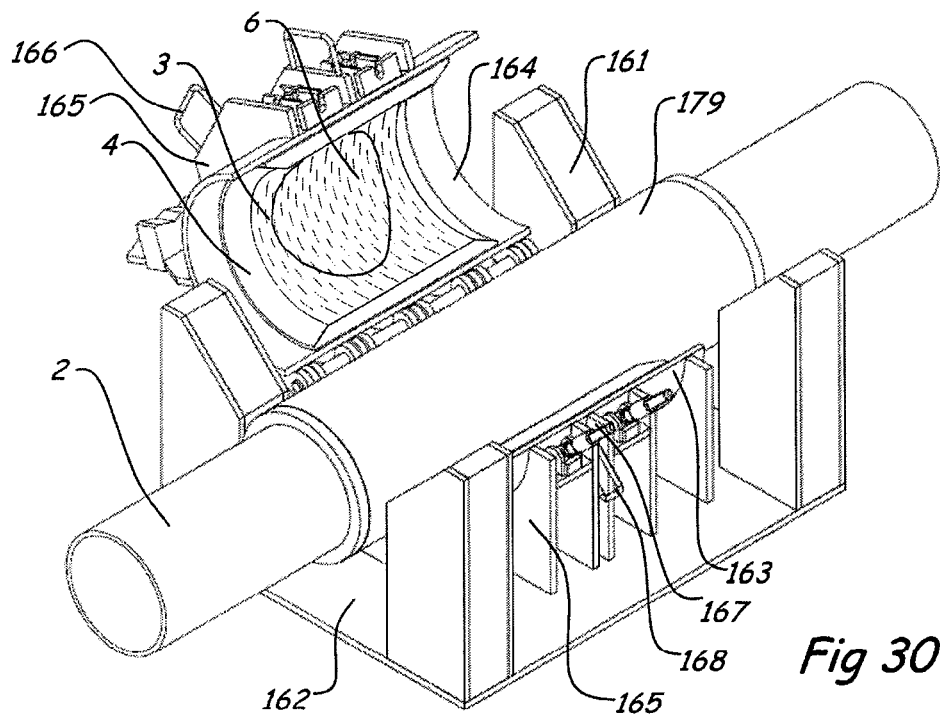
FIGS. 30 to 32 are perspective views of a thirteenth embodiment.
Figure 31:
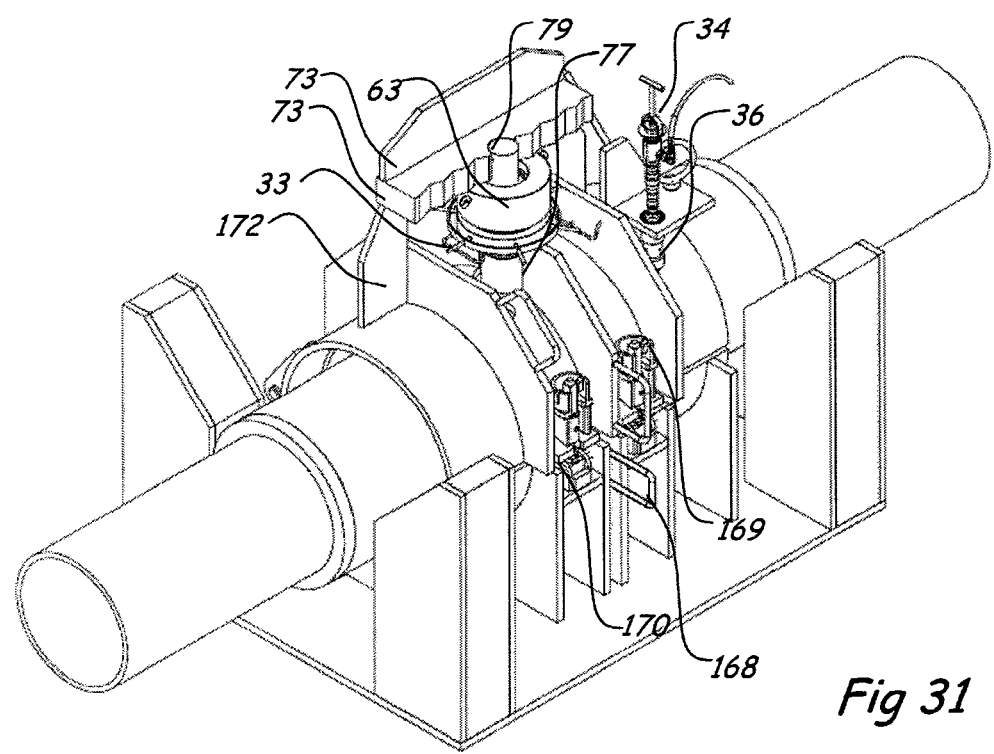
Figure 32:
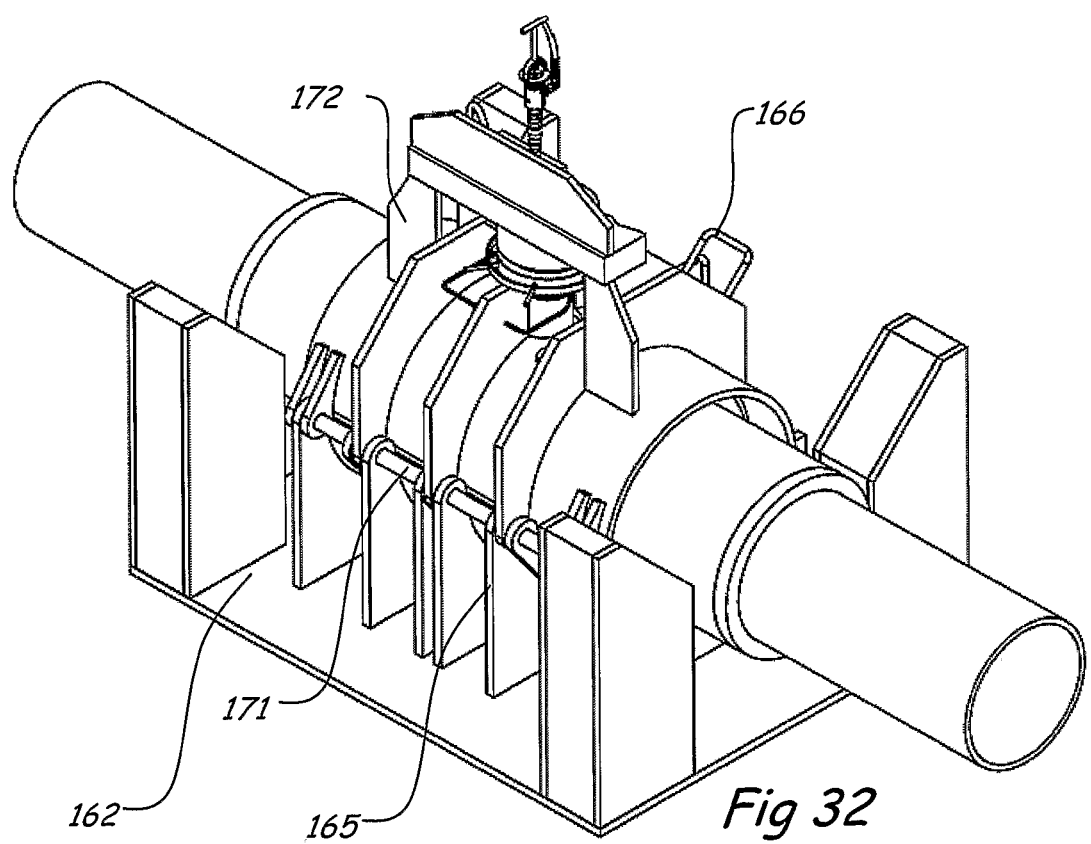

Fourteenth Embodiment (see FIGS. 30, 31 and 32)

This uses a hinged clamp to deliver the load to an internal tubular via the movable pad 6. FIG. 30 shows the clamp prior to closing of the hinged upper half shell 164.

FIG. 31 shows the clamp closed from the same view perspective and FIG. 32 shows the back view of the arrangement with upper half shell 164 closed.

Incorporated into the upper half shell 164 is a jacking arrangement as described above and shown in FIG. 13. In this case the collar 3 is split into two parts to allow the clamp to be hinged open.

The inner tube 2 may have a reinforcing doubler plate 179 to enhance resistance to the clamping force delivered buy the movable pad 6. The inner tube 2 will be lowered into the fixed lower half shell 163 assisted by the sloping faces of the upper support 161.

The fixed lower half shell 164 is supported on a base 162 via stiffeners 165.

The clamp hinge 171 allows the movable upper half shell 164 to rotate and close the clamp over the inner tube 2. Once closed the hinge ROV screw pins 167 are rotated about the ROV screw pin hinge 170 and located into the split ROV receptacles 169. By delivering a torque load to hinge ROV screw pins 167 the upper half shell 164 is secured against the fixed lower half shell 163. Following closure the jack load will be able to be delivered forcing the movable pad 6 against the inner tube 2. As with FIG. 13 once the jacking load has been delivered using hydraulic fluid pressure via the Hot Stab 34 the movable section of the jack 63 will separate from the fixed section of the jack. Once sufficient load has been imparted the collar 33 may be rotated thereby locking the movement of the jack and maintaining the clamping load. At this stage the hydraulic pressure delivered to the clamp may be removed.

Figure 35:
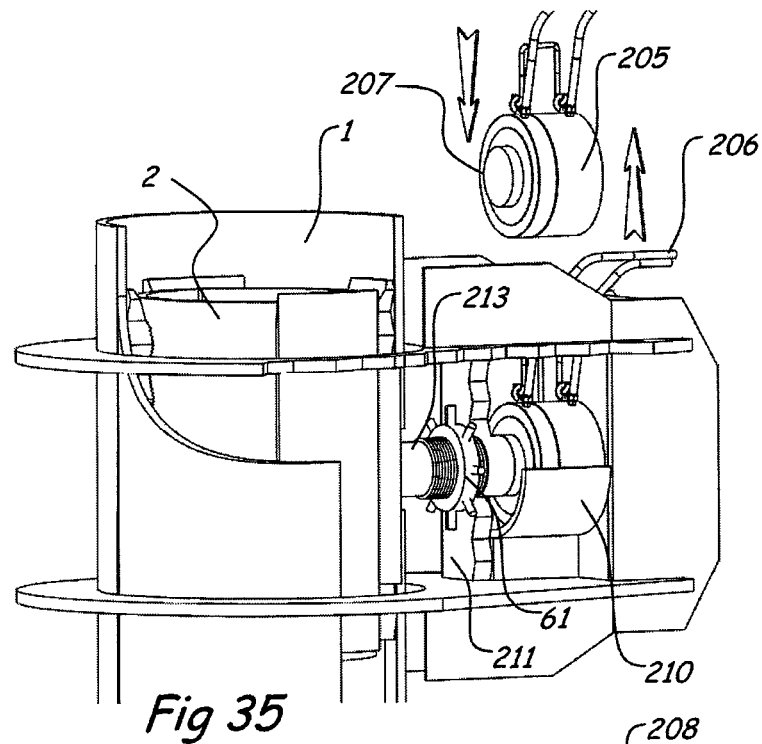
FIGS. 35 and 36 are partly cutaway views of a fifteenth embodiment.
Figure 36:
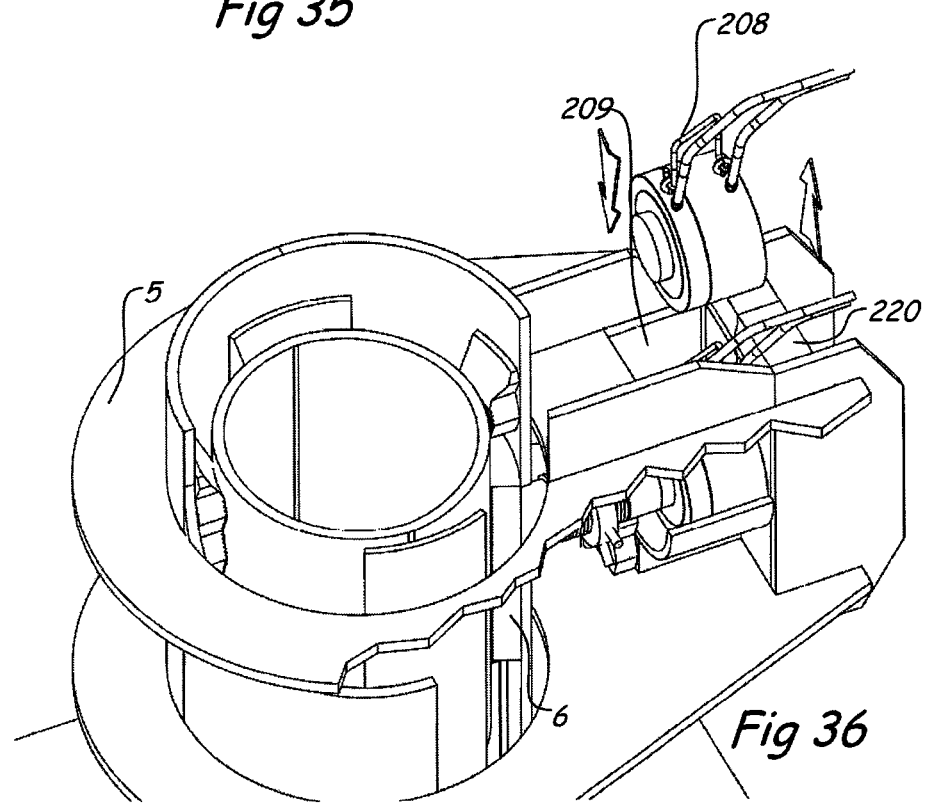

With reference to FIGS. 35 and 36 the following nine exemplary embodiments are described. A first exemplary embodiment is a tubular clamping arrangement for fixing two concentric tubes (1, 2) together comprising a pressure inducing member (6) to force the tubes together at at least one location of the outer tube. A support (3) is provided at the or each location opposite the said pressure member. The support may be a collar (3). The collar (3) may be fixed inside the outer tube (1).

A second exemplary embodiment may further to the first exemplary embodiment comprise that the pressure inducing member (6) is formed with a pad of substantially the same thickness as the collar (3), the collar having a recess (13) into which the pad can fit without protruding from the inner surface of the collar, wherein at least a part of the pad is retained in the recess throughout its pressure inducing travel.

A third exemplary embodiment may further to the first or second exemplary embodiment comprise external stiffening means (5) provided around the outer tube (1).

A fourth exemplary embodiment may in addition to the third exemplary embodiment comprise that the external stiffening means (5) is provided with a frame (12, 14) including a thrust plate (11) to support the pressure member (6).

A fifth exemplary embodiment according to the exemplary embodiments two to four, wherein the pressure member (6) is arranged to be urged towards the inner tube (2) by means of a screw or hydraulic jack or a hydraulically activated screw jack.

A sixth exemplary embodiment according to the fifth exemplary embodiment, wherein the jack comprises a first section (63) and a second section (64) arranged to be moved apart by hydraulic pressure to apply force to the pressure member (6) and wherein a locking means (61) is provided to provide a mechanical lock between the sections in a direction at least so as to retain load in the pressure member.

A seventh exemplary embodiment according to the fifth or sixth exemplary embodiment, wherein the jack (205) is arranged to be removable from a housing of the arrangement. The housing may, as in previous embodiments, comprise a plate (211) and a back plate (220). A rod (213) extends and is supported by the back plate (220). As shown in FIGS. 35 and 36, the hydraulic jack (205) or the hydraulically activated screw jack (205) may be removably positioned between the plate (211) and the back plate (220). Hereby the back plate (220) may provide support for the hydraulic jack (205) or the hydraulically activated screw jack (205), while the plate (211) may provide support for the locking collar (32, 61).

An eight exemplary embodiment according to any one of the preceding exemplary embodiments one to seven, wherein the outer tube is formed in two parts which are fixable together, so that the inner tube can be removed laterally from the outer tube or the outer tube from the inner tube, the pressure member (6) being mounted in one said part.

A ninth exemplary embodiment according to any one or more of the preceding exemplary embodiments one to eight, wherein there are a plurality of pressure inducing members (6).

The invention claimed is:

1. A tubular clamping arrangement for fixing two concentric tubes together, the two concentric tubes being an inner tube and an outer tube, the tubular clamping arrangement comprising:
    a single pressure inducing member that forces the two concentric tubes together at at least one location of the outer tube;
    a support provided at the or each location opposite the pressure inducing member;
    wherein said support being a collar, the pressure inducing member is formed as a pad of substantially the same thickness as the collar, the collar having a recess into which the pad can fit without protruding from an inner surface of the collar; and
    wherein at least a part of the pad is retained in the recess throughout its pressure inducing travel.

2. The arrangement as claimed in claim 1, wherein the collar is fixed inside the outer tube.

3. The arrangement as claimed in claim 1, wherein external stiffening means is provided around the outer tube.

4. The arrangement as claimed in claim 3, wherein the external stiffening means is provided with a frame including a thrust plate to support the pressure inducing member.

5. The arrangement as claimed in claim 4, wherein the thrust plate supports the pressure inducing member via multiple thrust rods.

6. The arrangement as claimed in claim 1, wherein the pressure inducing member is arranged to be urged towards the inner tube by means of a screw or hydraulic jack or a hydraulically activated screw jack.

7. The arrangement as claimed in claim 6, wherein the hydraulic jack or the hydraulically activated screw jack comprises a first section and a second section arranged to be moved apart by hydraulic pressure to apply force to the pressure inducing member and wherein a locking means is provided to provide a mechanical lock in a direction at least so as to retain load in the pressure inducing member.

8. The arrangement as claimed in claim 7, wherein the mechanical lock is a ratchet or threaded member.

9. The arrangement as claimed in claim 6, wherein the hydraulic jack or the hydraulically activated screw jack is arranged to be removable from a housing of the arrangement.

10. The arrangement as claimed in claim 6, wherein the outer tube is formed in two parts which are fixable together so that the inner tube can be removed laterally from the outer tube or the outer tube from the inner tube, the pressure inducing member being mounted in one part.

11. The arrangement as claimed in claim 10, wherein the two parts apply a load via plug elements to opposing pressure inducing members, the arrangement being clamped by turning a nut on a threaded rod or by rotating a cam piece at an end of a plain rod.

12. The arrangement as claimed in claim 6, wherein the arrangement further comprises a central rod extending between the pressure inducing member and the screw or the hydraulic jack or the hydraulically activated screw jack.

13. The arrangement as claimed in claim 6, wherein a ratchet device allows the pressure inducing members to only move in a clamping direction.

14. The arrangement as claimed in claim 1, wherein the pressure inducing member is urged towards an inner tube by means of a screw bearing rotated by a secondary gear wheel, wherein the secondary gear wheel is rotated by a primary gear wheel having a smaller radius than the secondary gear wheel.

* * * * *

UNITED STATES PATENT AND TRADEMARK OFFICE
CERTIFICATE OF CORRECTION

PATENT NO.       : 8,500,371 B2                                                          Page 1 of 1
APPLICATION NO. : 12/675634
DATED            : August 6, 2013
INVENTOR(S)      : Peter James Curry It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 531 days.

Signed and Sealed this

Fifteenth Day of September, 2015

Michelle K. Lee
*Director of the United States Patent and Trademark Office*